United States Patent [19]

Sasaki

[11] Patent Number: 5,757,572
[45] Date of Patent: May 26, 1998

US005757572A

[54] SEARCHING A HELICAL AUTOREVERSE MAGNETIC TAPE FOR A DESIRED PROGRAM INFORMATION FROM BOTH SIDES OF THE TAPE

[75] Inventor: Tadao Sasaki, Kanagawa, Japan

[73] Assignee: Sony Corporation, Tokyo, Japan

[21] Appl. No.: 559,737

[22] Filed: Nov. 15, 1995

[30] Foreign Application Priority Data

Nov. 22, 1994 [JP] Japan ................... 6-311339

[51] Int. Cl.$^6$ .......................... G11B 15/18; G11B 15/48
[52] U.S. Cl. ............... 360/72.2; 360/74.4; 360/74.1
[58] Field of Search .................... 360/74.1, 74.4, 360/72.1, 72.2, 72.3, 74.2, 74.3, 74.5

[56] References Cited

U.S. PATENT DOCUMENTS

| | | | |
|---|---|---|---|
| 4,516,740 | 5/1985 | Yoshino et al. | 360/73.08 X |
| 4,665,443 | 5/1987 | Tanaka | 360/74.1 X |
| 5,394,279 | 2/1995 | Furuta | 360/72.1 |
| 5,481,413 | 1/1996 | Kawada et al. | 360/53 |

OTHER PUBLICATIONS

Philips Consumer Electronics, "DCC System Description," Philips and Matsushita, Mar. 1993.

*Primary Examiner*—Aristotelis M. Psitos
*Assistant Examiner*—Larry T. Cullen
*Attorney, Agent, or Firm*—Jay H. Maioli

[57] ABSTRACT

In a reproducing apparatus having the capability of reproducing data in both directions from a recording medium in the form of a tape, when a program recorded on the recording medium in the form of a tape is accessed in a high speed mode, a fast forward tape travel operation or a fast reverse tape travel operation is performed while monitoring the program number recorded in the area opposite to the current reproducing position, and the searching speed is controlled when the searching position reaches a location near a reverse position so that the searching position does not go beyond the reverse position. A recording apparatus operates to record a program number on a recording medium in the form of a tape on the basis of the program number which was recorded at the end of the previous recording operation so that a correct value is given as the program number to the current recording operation.

6 Claims, 16 Drawing Sheets

FIG. 7

| WORD\BIT | D11 MSB | D10 | D9 | D8 | D7 | D6 | D5 | D4 | D3 | D2 | D1 | D0 LSB |
|---|---|---|---|---|---|---|---|---|---|---|---|---|
| CW0 | \multicolumn{12}{l}{FORMAT ID, COMPATIBILITY ID} |||||||||||
| CW1 | OVER FLOW | \multicolumn{11}{l}{LEVEL METER INFORMATION / LEVEL ENVELOPE SIGNAL} |||||||||||
| CW2 | \multicolumn{12}{l}{PROGRAM TIME INFORMATION (CBCD) BINARY ADDRESS} |||||||||||
| CW3 | \multicolumn{12}{l}{RECORDING DATE AND TIME (CBCD)} |||||||||||
| CW4 | \multicolumn{12}{l}{BACK AREA 0} |||||||||||
| CW5 | \multicolumn{12}{l}{BACK AREA 1} |||||||||||
| CW6 | \multicolumn{12}{l}{BACK AREA 2} |||||||||||
| CW7 | \multicolumn{12}{l}{OWP DATA} |||||||||||
| CW8 | \multicolumn{12}{l}{BACK AREA 4} |||||||||||
| CW9 | \multicolumn{12}{l}{BACK AREA 5} |||||||||||
| CW10 | \multicolumn{12}{l}{REVERSE DOWN COUNTER} |||||||||||
| CW11 | \multicolumn{12}{l}{AMS, REVERSE FLAG} |||||||||||
| CW12 | \multicolumn{12}{l}{BACK AREA 8} |||||||||||
| CW13 | \multicolumn{12}{l}{BACK AREA 9} |||||||||||
| CW14 | \multicolumn{12}{l}{BACK AREA 10} |||||||||||
| CW15 | \multicolumn{12}{l}{BACK AREA 11} |||||||||||
| CW16 | \multicolumn{12}{l}{BACK AREA 12} |||||||||||
| CW17 | \multicolumn{12}{l}{BACK AREA 13} |||||||||||
| CW18 | \multicolumn{12}{l}{BACK AREA 14 (TEST DATA 0)} |||||||||||
| CW19 | \multicolumn{12}{l}{BACK AREA 15 (TEST DATA 1)} |||||||||||

FIG. 8

FORMAT OF CW11

| BIT | | | | | | | | | | | |
|---|---|---|---|---|---|---|---|---|---|---|---|
| D11 | D10 | D9 | D8 | D7 | D6 | D5 | D4 | D3 | D2 | D1 | D0 |
| DEVICE TYPE FLAG | RE-VERSE CANCEL FLAG | AFTER RE-VERSE FLAG | BEFORE-RE-VERSE FLAG | IN-PRO-GRAM FLAG | PRO-GRAM START FLAG | SKIP FLAG | PROGRAM NUMBER | | | | |

SEARCHING A HELICAL AUTOREVERSE MAGNETIC TAPE FOR A DESIRED PROGRAM INFORMATION FROM BOTH SIDES OF THE TAPE

BACKGROUND OF THE INVENTION

1. Field of the Invention

The present invention relates to a recording and/or reproducing apparatus suitable for recording and/or reproducing audio data or the like using a magnetic tape.

2. Description of the Prior Art

A non-tracking recording technique is known in the art and in the technology to record data using a magnetic tape as a recording medium.

A magnetic tape T is scanned by a head in a helical scan fashion. As a result, tilted tracks Tk are formed across the tape T as shown in FIG. 1. In the non-tracking technique, reproduction is performed in such a manner that tracks Tk are traced a greater number of times than the tracks were recorded, that is, the tracks Tk are scanned with a higher scanning density as represented by solid line Pa and broken line Pb in FIG. 1. This allows all data to be read from the tracks Tk without having to precisely trace the tracks. After reading the data, the data is rearranged in a memory space, on the basis of the addresses which are recorded together with the data so that a correct data stream is reproduced.

The non-tracking technique may be applied to a system for recording and/or reproducing data on and/or from a magnetic tape in both the forward and reverse tape travel directions. When a magnetic tape cassette is mounted with its one face facing up, data is recorded or reproduced onto or from the upper portion of the magnetic tape in one direction. On the other hand, if the magnetic tape cassette is mounted with the other face facing up, data is recorded or reproduced onto or from the lower portion of the magnetic tape in the opposite direction. In FIG. 1, there are shown only the tracks which are recorded or reproduced in one direction.

To use a tape system in both directions, a so-called automatic reverse technique is known in the art. In this automatic reverse technique, when recording or reproducing along the upper part of a magnetic tape in one direction (forward direction) is complete, the magnetic tape is transported in the opposite direction (reverse direction) so that recording or reproducing can be performed onto or from the lower part of the magnetic tape in the opposite direction without removing and remounting the tape cassette so that the opposite side faces up.

In the case where an automatic reverse operation is realized for a conventional tape system such as a compact cassette tape, when it is detected that the tape travel in one direction reaches an end of a tape, the tape travel is reversed.

However, in this automatic reverse technique, since a leader tape is present at the ends of a tape, and the certain finite time is required to mechanically switch the tape travel direction, a break occurs in the reproduction signals and some data is lost.

To avoid the above problem, in a non-tracking recording/reproducing apparatus for recording/reproducing digital audio data, when tape travel reaches a certain point near an end of a tape, the tape motion is switched into the reverse direction. When the tape motion is switched, data to be recorded or data reproduced is stored in a memory so that the data may be fully recorded or reproduced without any loss during the tape motion switching period. This allows a user to use a both-way tape as if it were a one-way tape having a length twice the actual physical tape length.

In the non-tracking technique, in addition to audio data, control (CTL) data is also recorded on tracks. In a recording operation, a reverse mark is written at a position at which the tape movement is reversed so that the reverse mark serves, in a reproducing operation, as control data indicating the reverse position.

However, a problem in switching the tape travel direction can occur during a searching operation. To search the starting point of a desired program, a tape is moved at a high speed, and tracks are scanned and reproduced while monitoring the control data. However, during the above high-speed tape movement, the track tracing is performed at a rather great angle to the helical scan tracks, and thus all data on tracks cannot be read. This means that all control data cannot be read, and the reverse mark may be missed. If the reverse mark is missed, the tape movement is not switched into the opposite direction at a correct position, and the tape moves further until an end of the tape is reached. Thus, the searching time will become longer. In some cases, a wrong position may be erroneously recognized as a correct position, and the operation may stop at that wrong position.

In a system using a recording medium in the form of a tape, the geometrical structure of the recording medium leads to difficulty in quick searching for a desired program as opposed to a system using a recording medium in the form of a disk. Therefore, it is required not only to solve the problem of switching the tape travel direction at the reverse position but also to achieve a great improvement in the speed of searching operations (for example, searching for the starting point of a program).

In view of the above problems in a system using a tape in both directions, it is an object of the present invention to provide a technique of not only preventing an erroneous operation at a reverse position but also improving the speed of the program search operation.

SUMMARY OF THE INVENTION

To achieve the above objective, the present invention provides a reproducing apparatus having the capability of searching for a desired data block recorded on a recording medium in the form of a tape, the recording medium having two parts separated at a substantially central line extending along the length of the recording medium, a forward track group being formed on one of the two parts, a reverse track group being formed on the other part, the reproducing apparatus comprising:

a reproducing head for reading data from the forward and reverse track groups at the same time;

a memory which, during an operation of searching for the desired data block, stores data number information corresponding to each data block reproduced from one of the forward and reverse track groups, and also stores data number information reproduced from the other one of the forward and reverse track groups; and a controller which, during the operation of searching the desired data block, controls the operation of switching the searching direction on the basis of the data number information associated with both forward and reverse track groups.

The present invention also provides a recording apparatus for recording a data block and a data block number corresponding to the data block on a recording medium in the form of a tape, the recording medium having two parts separated at a substantially central line extending along the length of the recording medium, a forward track group being formed on one of the two parts, a reverse track group being formed on the other part, the recording apparatus comprising:

a memory for storing a data block number corresponding to the data block recorded at the end of a recording operation; and a recording unit which, at the start of a recording operation, records a data block number, which is greater by one than the data block number stored in the above-described memory, on the recording medium in the form of a tape.

In the present invention, data is read from both the forward and reverse track groups at the same time so that the shortest possible operation for getting to the target position is determined from the data number information obtained from the track group opposite to the current position.

Furthermore, the data number information associated with the track group being currently searched and the data number information which is read at the same time from the other track group are used to detect whether the searching point has reached a location near the reverse position and also used to determine whether it is possible to reverse the tape travel direction at a position other than the reverse position.

If it is detected, from the data number information or information of time remaining to reach the reverse position, that the searching point has reached a location near the reverse position, the searching speed is reduced so that the reverse position can be correctly detected without being missed.

When the data number information is used in the searching operation, an erroneous operation can occur if a plurality of data units recorded on the same tape have an identical data number. In the present invention, the above problem is avoided by assigning a data number as follows. That is, a data unit which is recorded at the start of a recording operation is given a data number greater by one than that given to the data unit which was recorded at the end of the previous recording operation. This ensures that the data units recorded on the same tape have different data numbers.

BRIEF DESCRIPTION OF THE DRAWINGS

FIG. 7 is a schematic representation of CTL words;

FIG. 8 is a schematic representation of the data structure of a CTL word $CW_{11}$;

DESCRIPTION OF THE PREFERRED EMBODIMENTS

Figure 2:
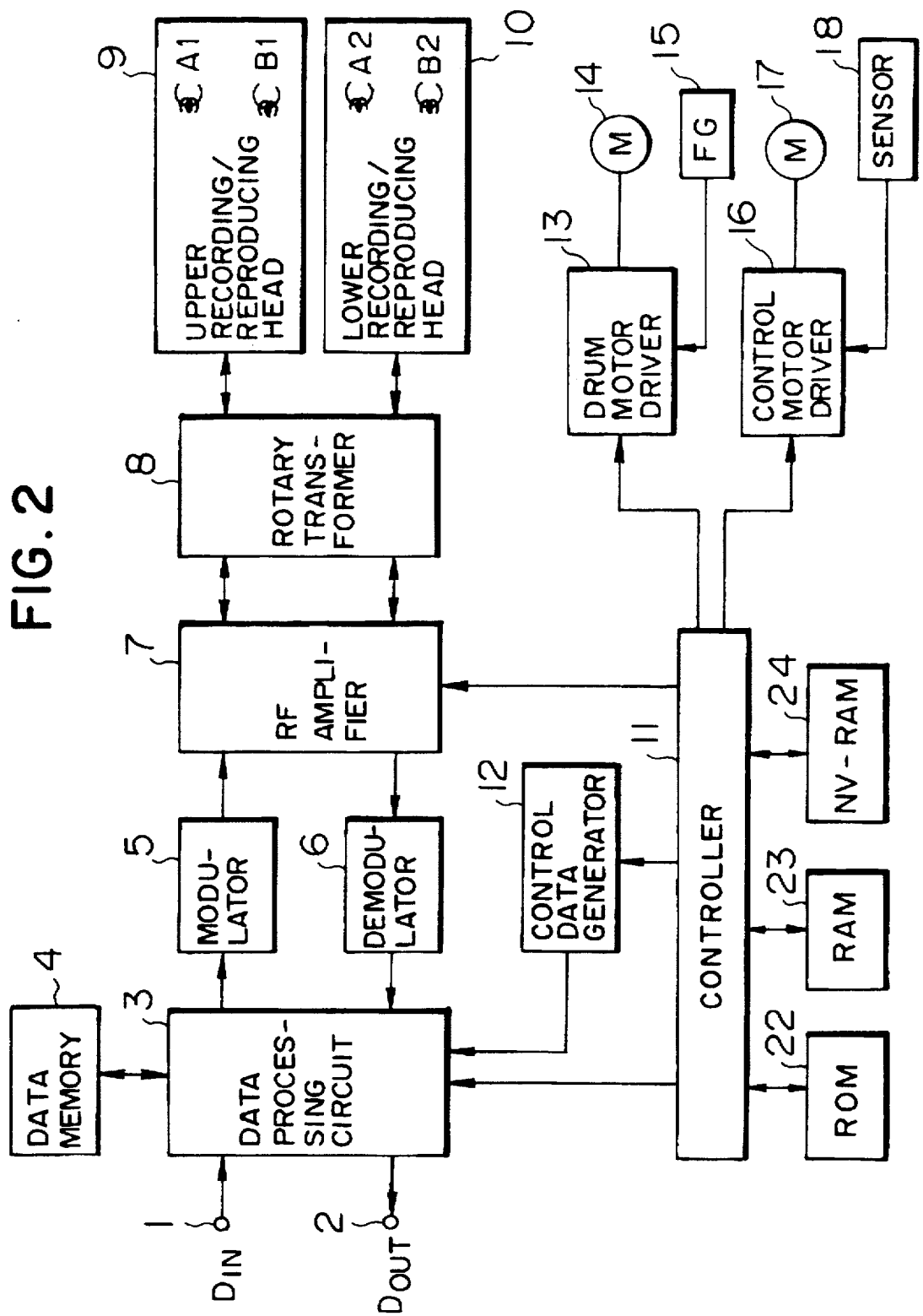
FIG. 2 is a block diagram of a recording/reproducing apparatus according to the present invention.

Referring to the preferred embodiments, a recording/reproducing apparatus according to the present invention will be described in detail below. It is assumed here that the invention is applied to an apparatus for recording and/or reproducing audio data or the like in a non-tracking fashion on/from helical scan tracks on a magnetic tape serving as a recording medium. FIG. 2 is a block diagram illustrating the construction of the recording/reproducing apparatus.

In FIG. 2, reference numeral 1 denotes a data input terminal via which a digital audio signal $D_{in}$ to be recorded is input. Reference numeral 2 denotes a data output terminal via which a reproduced digital audio signal $D_{out}$ is output. A signal output from, for example, a microphone is converted from analog form to digital form and applied to the data input terminal 1. The signal output via the data output terminal 2 is converted from digital form to analog form and then supplied to an amplifier and further a loudspeaker or the like thereby providing an audible signal.

Reference numeral 3 denotes a data processing circuit for encoding record data and decoding reproduction data. The data processing circuit 3, in conjunction with a memory 4 connected to the data processing circuit 3, converts the data supplied from the outside into the form of record data, and also converts the reproduced data into the form suitable as output data. The data processing circuit 3 also divides the data supplied from the outside into blocks in a predefined form, and adds a block number and an error correction code to each block. The data processing circuit 3 performs these processing operations under the control of a controller 11 constructed with a microcomputer.

The record data consists of audio data and various codes such as control (CTL) codes and an overwrite protect (OWP) code. These codes are generated by a control data generator 12 under the control of the controller 11, and supplied to the data processing circuit 3. These codes are added to the record data during the above-described encoding process so that the resultant record data has a predefined format.

One of the control codes is a program number. As will be described in greater detail later, the data processing circuit 3 monitors the level of the input signal and transmits the detected information to the controller 11 so that the program number associated with the record data is updated on the basis of the detected information.

The record data, which has been converted by the data processing circuit 3 in the form suitable as the record data, is sent to a modulator 5. The modulator 5 modulates the received data into a record signal in the form suitable for being recorded. The record signal is applied to an RF amplifier 7. The RF amplifier 7 is connected, via a rotary transformer 8, to an upper recording/reproducing head unit 9 disposed at an upper location of a rotary head drum and also to a lower recording/reproducing head unit 10 disposed at a lower location of the rotary head drum. The RF amplifier 7 includes four separate amplifier systems wherein two of those are connected to magnetic heads A1 and B1, respectively, of the upper recording/reproducing head unit 9 and the remaining two are connected to magnetic heads A2 and B2, respectively, of the lower recording/reproducing head unit 10, although they are not described here in further detail. The magnetic heads A1, A2, B1, and B2 are all of the type capable of recording and reproducing data.

For example, when a recording operation is performed using the upper recording/reproducing head unit 9, the record data is supplied, via the RF amplifier and the rotary transformer 8, to the magnetic heads A1 and B1 of the upper recording/reproducing head unit 9 in such a manner that one track of record data is supplied alternately to the magnetic heads A1 and B1. The magnetic heads A1 and B1 record the received data onto a magnetic tape.

On the other hand, the reproduction signals obtained by the magnetic heads A1 and B1 of the upper recording/ reproducing head unit 9 and by the magnetic heads A2 and B2 of the lower recording/reproducing head unit 10 are respectively applied to the RF amplifier 7 via the rotary transformer 8. The RF reproduction signal is amplified by the RF amplifier 7 and then applied to a demodulator 6. The demodulator 6 extracts reproduction data and an associated clock component from the received signal, and supplies the extracted data and clock component to the data processing circuit 3.

The data processing circuit 3, in conjunction with the data memory 4, performs a synthesis operation on the received reproduction data so as to reconstruct original data corresponding to each track. The data processing circuit 3 also performs error detection and error correction using the error correction code associated with the reproduction data. When complete data for each track has been obtained via the above-described processes, the resultant digital audio data is output via the data output terminal 2.

The controller 11 performs controlling operations as required in response to the CTL codes and OWP code contained in the reproduced data.

Reference numeral 13 denotes a drum motor driver. Under the control of the controller 11, the drum motor driver 13 drives a rotary head drum motor 14 so that it rotates at a predetermined speed. In this driving operation, the rotation speed of the rotary head drum is detected by a frequency generator (FG) 15.

On the other hand, the traveling motion of a magnetic tape mounted on the recording/reproducing apparatus is controlled by a control motor 17 which is driven by a control motor driver 16 under the control of the controller 11. In this operation, the current tape condition is detected by a sensor 18.

The controller 11 includes a ROM (read only memory) 22, a RAM (random access memory) 23, and a non-volatile RAM 24. The ROM 22 is used to store a basic program and related process parameters used in the operation. The RAM 23 is used as a working memory during the operation and also used to store temporary variables. The non-volatile RAM 24 is used to store data which should be maintained there after the power is turned off. More particularly, in the present invention, the non-volatile RAM 24 is used to store program numbers as described later in greater detail.

Figure 3A:
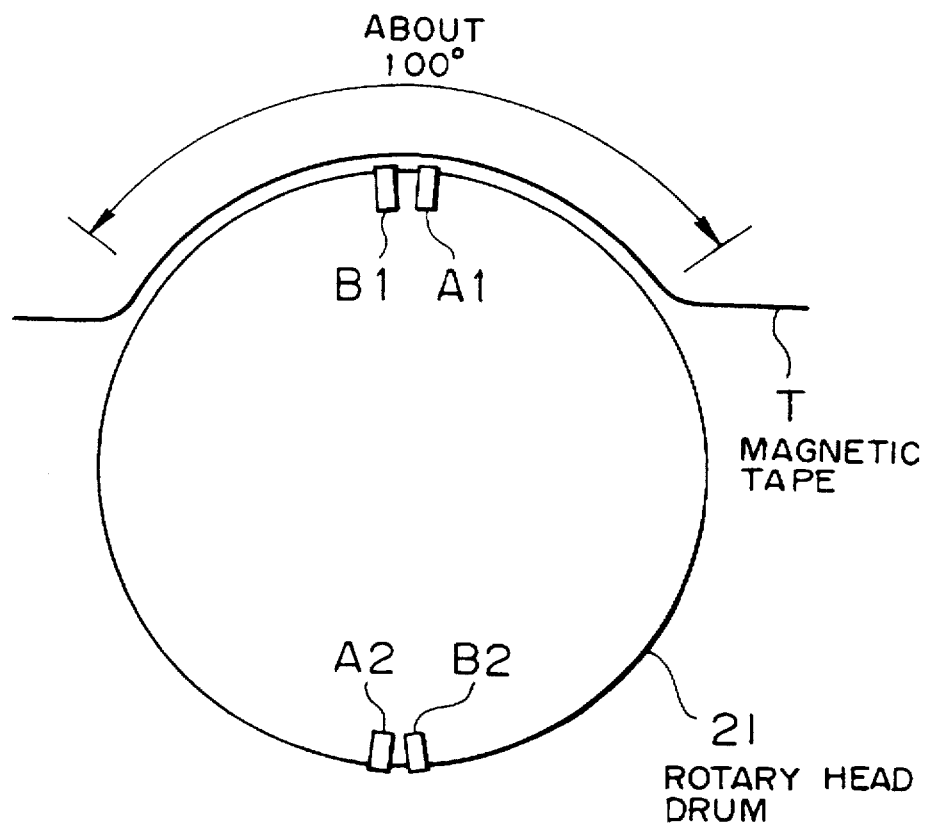
FIG. 3A is a schematic diagram illustrating the configuration of a rotary drum.
Figure 3B:
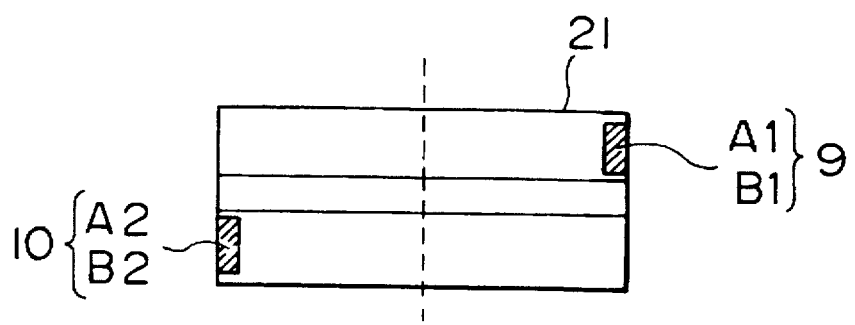
FIG. 3B is a schematic diagram illustrating magnetic heads disposed on the rotary drum.

FIGS. 3A and 3B illustrate the configuration of the rotary head drum and the magnetic heads disposed thereon, according to the present embodiment of the invention, wherein the locations, seen from above, of the magnetic heads on the rotary head drum 21 are shown in FIG. 3A, and the locations, in the vertical direction, of the magnetic heads on the rotary head drum 21 are shown in FIG. 3B.

As shown in FIG. 3A, the magnetic heads A1 and B1 are disposed close together at a predetermined location on the rotary head drum 21. The magnetic heads A1 and B1 have an azimuth angle different from each other, and their heights are different from each other by an amount corresponding to the width of one track. These magnetic heads A1 and B1 form the upper recording/reproducing head unit 9 which looks like a single double-azimuth recording/reproducing head. In FIG. 3A representing the horizontal locations of heads, the magnetic heads A2 and B2 are disposed close together at a location apart by 180 degrees from the magnetic heads A1 and B1. The azimuth angles of these two magnetic heads A2 and B2 are also different from each other, and their heights are different from each other by an amount corresponding to the width of one track.

The magnetic heads A2 and B2 form the lower recording/ reproducing head unit 10 which looks like a single double-azimuth recording/reproducing head unit.

As shown in FIG. 3B, the magnetic heads A1 and B1 are located at a different height from that of the magnetic heads A2 and B2. As will be described later in greater detail in connection with FIG. 5, the magnetic heads A1 and B1 correspond to the upper track group (normal track group) $T_U$ and the magnetic heads A2 and B2 correspond to the lower track group (reverse track group) $T_L$.

Taking the magnetic heads A1 and B1 as an example, a recording/reproducing scanning operation will be described in connection with FIG. 4.

A magnetic tape T is wound around the rotary head drum 21 at an angle within about 100°.

In a recording operation, one writing operation is performed during a time period during which the rotary head drum 21 rotates twice. For example, in a first revolution of the rotary head drum 21, a recording scan is performed with the head A1 as represented by the solid lines in FIG. 4. In the following second revolution, recording is not performed. In the third revolution, a recording scan is performed with the head B1 as represented by the solid lines in FIG. 4. In the fourth revolution, recording is not performed. In this way, tracks are formed alternately with the heads A1 and B1 at alternately different azimuth angles.

Figure 1:
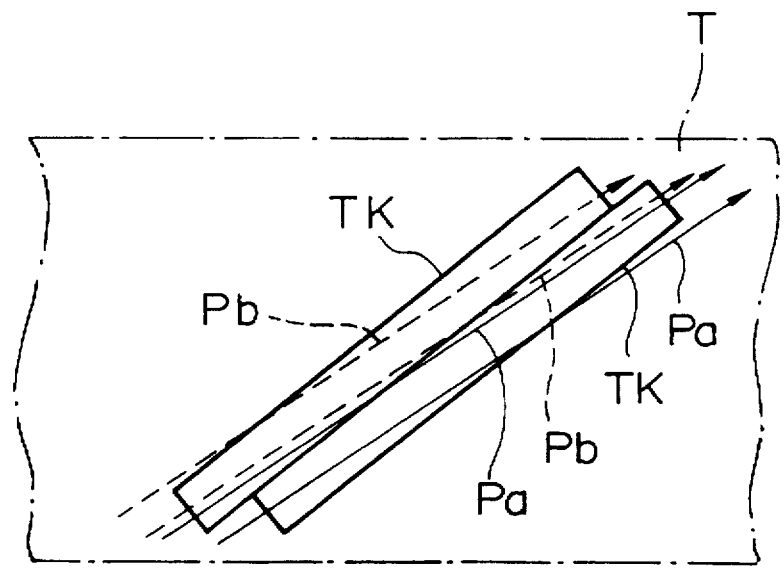
FIG. 1 is a schematic diagram illustrating tracks recorded on a magnetic tape T and the trajectory of rotary head motion.

On the other hand, in a reproducing operation, no tracking control is performed as described earlier in connection with FIG. 1. As a result, the scanning loci of the magnetic heads are not coincident with the recorded tracks. To avoid the problems associated with the deviation of the scanning loci from the recorded tracks, double density scanning is performed.

As described above, a recording operation onto one track is completed with two revolutions of the rotary head drum, and therefor during a reproducing operation, the tape travels a distance corresponding to one track during two revolutions of the rotary head drum 21. That is, data is read by the head A1 or B1 during each revolution by scanning the head over the tracks at a double density as represented by broken lines in FIG. 4.

Figure 4:
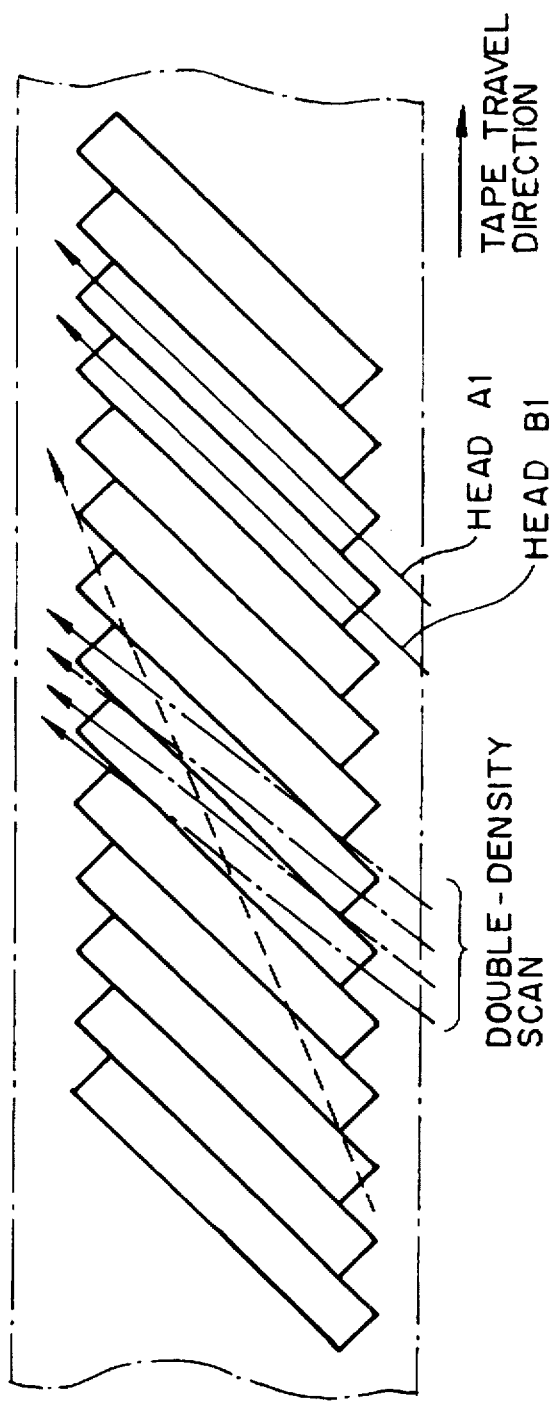
FIG. 4 is a schematic diagram illustrating tracks recorded on a magnetic tape and the trajectory of rotary head motion.
Figure 5:
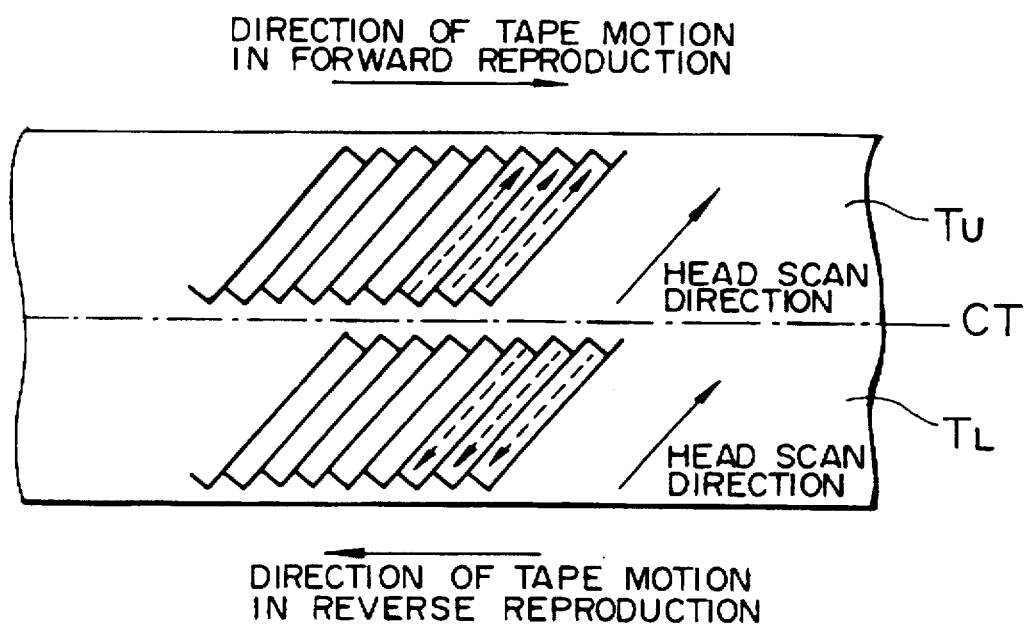
FIG. 5 is a schematic diagram illustrating tracks which are recorded on a magnetic tape according to an automatic reverse technique, and also illustrating trajectories of rotary head motion.

In this embodiment, the tape travels in both directions wherein the upper track group (normal track group) $T_U$ and the lower track group (reverse track group) $T_L$ are formed on the upper and lower regions, respectively, separated by the center line CT as shown in FIG. 5. In FIG. 4, only one track group is shown.

The magnetic heads are located as shown in FIG. 3B so that the upper head unit 9 (magnetic heads A1 and B1) are responsible for recording and reproducing operations along the upper track group $T_U$ shown in FIG. 5, and the lower head unit 10 (magnetic heads A2 and B2) are responsible for recording and reproducing operations along the lower track group $T_L$ also shown in FIG. 5.

In the present embodiment, when a reproducing operation is performed for example along the upper track group $T_U$ via the upper head unit 9, it is also possible to read data from the lower track group $T_L$ via the lower head unit 10, and vice versa.

The upper head unit 9 and the lower head unit 10 are disposed on the same rotary head drum 21 which is assumed here to rotate in the same direction during both forward and reverse operations, and thus the direction of the head scan motion becomes the same for both track groups $T_U$ and $T_L$ as shown in FIG. 5.

On the other hand, in the reverse operation, the tape travels in the opposite direction to that during the forward operation. Data is recorded on tracks in the same direction from the center line CT toward an edge of the tape in both cases of the track groups $T_U$ and $T_L$ as represented by the broken lines in FIG. 5. The above-described construction allows the recording/reproducing apparatus to operate regardless of whether a tape cassette is mounted with either side facing up or down. In the case where a tape cassette is mounted in a reversed manner so that the other side faces up, the lower track group $T_L$ shown in FIG. 5 is scanned by the upper head unit 9 during a recording or reproducing operation.

As described above, in the case of the track group $T_L$, data is recorded on tracks in the direction opposite to that of the head scan movement. Therefore, the data processing circuit 3 rearranges the data which is to be recorded onto or has been read from the track group $T_L$ so that the order of the data is reversed for each track.

Figure 6A:
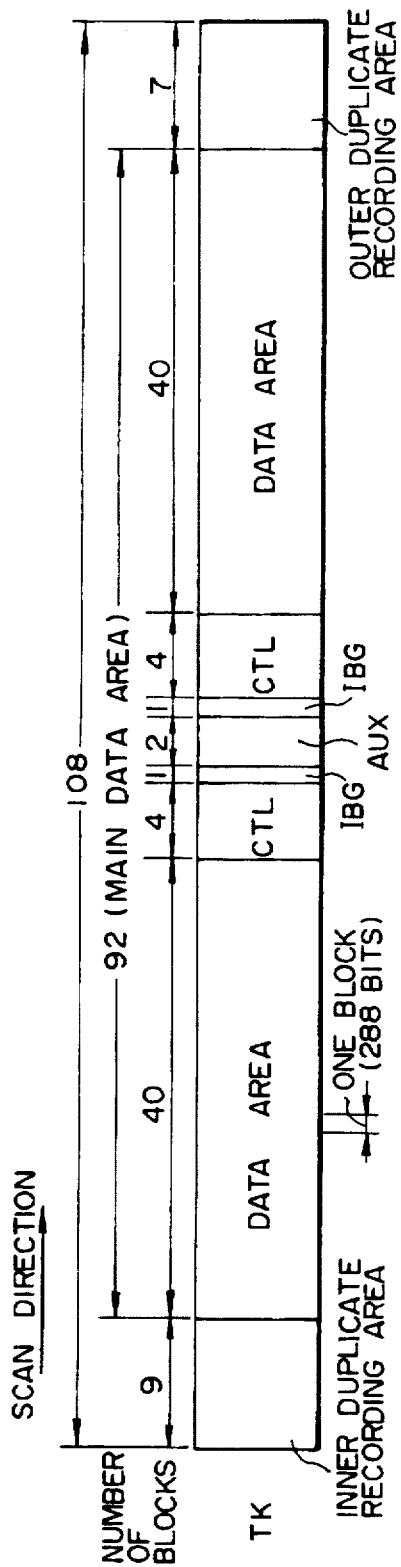
FIG. 6A is a schematic representation of the data structure of the tracks recorded on a magnetic tape.

FIG. 6A illustrates the configuration of a track TK which is formed on a magnetic tape according to the non-tracking technique. Each track of the track groups $T_U$ and $T_L$ has the same configuration as that shown here.

As can be seen from FIG. 6A, one track includes 108 blocks wherein each block is composed of 288 bits.

Of the 108 blocks of a track, 92 blocks in the central region are used as a main data area. An inner duplicate recording area consisting of 9 blocks and an outer duplicate recording area consisting of 7 blocks are formed at the respective ends of each track.

The inner duplicate recording area is used to record the same data as that recorded in the main data blocks which are located 92 blocks apart from the inner duplicate recording blocks toward the outer area. The outer duplicate recording area is used to record the same data as that recorded in the main data blocks which are located 92 blocks apart from the outer duplicate recording blocks toward the inner area. The duplicated recording in these inner and outer duplication areas ensures that the heads can read all data in the main data blocks without missing any data even if the head contact position is disturbed by the vibrations of the tape.

The two blocks at the center of the main data area are for sub-codes (AUX). One block at either side of the AUX area serves as an IBG (inter-block gap). Four blocks adjacent to either IBG are assigned for control (CTL) codes. Data areas each consisting of 40 blocks are disposed adjacent to the respective control code areas.

Figure 6B:
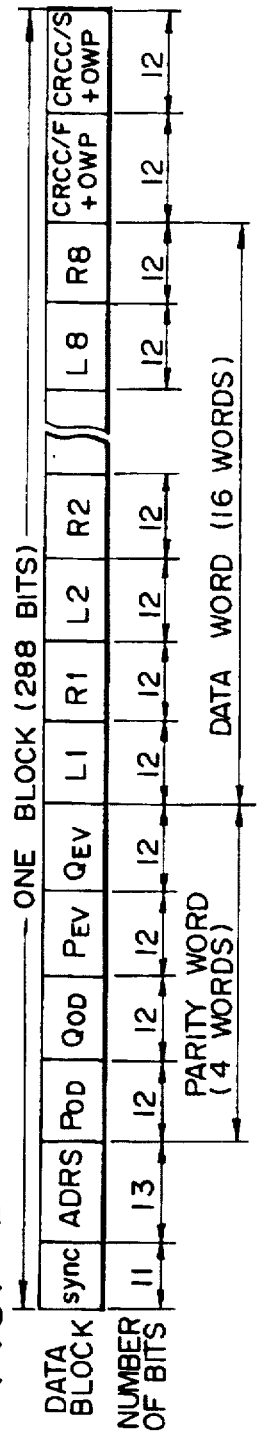
FIG. 6B is a schematic representation of data recorded in a data area of a track on a magnetic tape.

Each block in the data area is configured according to a signal format shown in FIG. 6B. The 11 bits at the leading end are assigned for a sync pattern. The following 13 bits are used to record an address ADRS. The address ADRS consists of a 6-bit track address and a 7-bit block address.

In the reproducing operation, it is possible to arrange the blocks in a correct order on the basis of the track address and the block address recorded in each block thereby correctly reconstructing a data stream.

In the non-tracking technique, the tracks TK are not guaranteed to be traced precisely. Therefore, as described earlier in connection with FIG. 4, double-density scanning is performed so that all blocks of each track can be read without missing any data. However, in this case, blocks are read in a random order. After reading the data from the blocks, the data is temporarily stored in the data memory 4. In this process, a write address is generated from the track address and the block address, and the data of each block is written into the data memory 4 at the location corresponding to the resultant write address. Therefore, when all blocks of a track have been read, the data of that track is arranged in the correct order in the memory space of the data memory 4. If the data is read from the data memory 4 simply from block to block, a correct data stream is reconstructed.

Following the address ADRS, 4 words of P- and Q-parities ($P_{OD}$, $Q_{OD}$, $P_{EV}$, $Q_{EV}$) each consisting of 12 bits are recorded as shown in FIG. 6B.

Following the parity words, 16 words of data ($L_1$, $R_1$ ... $L_8$, $R_8$) each consisting of 12 bits are recorded.

Furthermore, following the 16 words of data, two CRCC words each consisting of 12 bits are recorded wherein each CRCC word includes an overwrite protect (OWP) code.

In the non-tracking technique, a shift of the recording area is permitted. Therefore, old data can remain at either end of a track without being erased. Furthermore, if some heads are contaminated with dust or the like or drop-out occurs during an overwrite operation, some parts may remain without being erased. These incorrectly-remaining parts are incorrectly regarded as correct data in the CRCC checking. To avoid this problem, an OWP code is recorded at the end of each writing operation.

In a reproducing operation, an OWP code is extracted from each block when the blocks on a track are scanned. Then, a reference OWP code is determined according to the majority rule.

If an unerased block is present in a certain track, the OWP code extracted from that unerased block will be inconsistent with the OWP codes extracted from the correctly-overwritten blocks. Therefore, when a track including a small number of unerased blocks is read, the major part of the track consists of correctly-overwritten blocks and thus the OPW codes of the correctly-overwritten blocks can be easily identified by applying the majority rule.

The OWP code determined according to the majority rule is selected as a reference OWP code. In the reproducing operation for that track, those blocks having an OWP code inconsistent with the reference OWP code are regarded as invalid blocks remaining unerased, and they are discarded. Therefore, such incorrect data is not output.

In practice, identical two OWP codes are disposed in each successive two words and these OWP codes are subjected to a 24-bit exclusive-OR operation with respect to the CRCC. Then, the result of the exclusive-OR operation is recorded. Therefore, in a reproducing operation, if an exclusive-OR operation is performed for the OWP words and the CRCC generated from the reproduction data, a correct OWP code is reproduced.

Figure 6C:
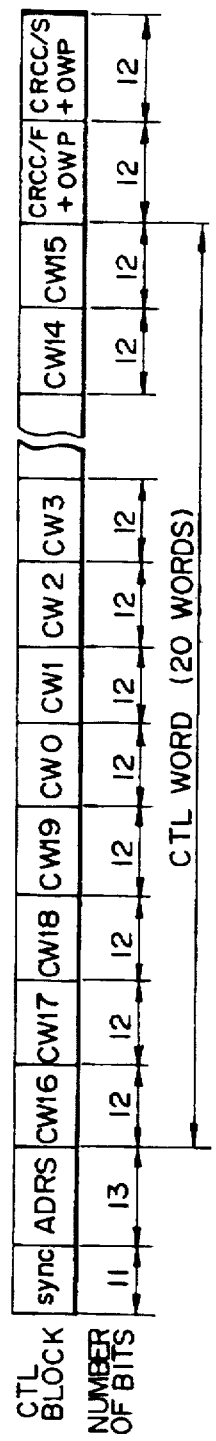
FIG. 6C is a schematic representation of data recorded in a CTL area of a track on a magnetic tape.

FIG. 6C illustrates the signal format of a CTL block.

As in data blocks, the 11 bits at the leading end of the block are assigned for a sync pattern, and the following 13 bits are used to record an address ADRS.

Then, 20 words of CTL codes consisting of $CW_{16}$, $CW_{17}$, $CW_{18}$, $CW_{19}$, $CW_0$, $CW_1$, ..., $CW_{15}$ are disposed.

Following the 20 words of CTL codes, two CRCC words each consisting of 12 bits are recorded wherein each CRCC word includes an OWP code.

In the 20 CTL words $CW_0$, ..., $CW_{19}$, various control data are recorded as shown in FIG. 7.

The CTL word $CW_0$ is assigned to a format ID and a compatibility ID. The CTL word $CW_1$ is used to record level meter information and level envelope information. In the CTL word $CW_2$, time information and a binary address are recorded. The CTL word $CW_3$ is used to record the information about the recording date and recording time.

The CTL word $CW_7$ is used to record OWP data.

The CTL word $CW_{10}$ is used to record a reverse down counter, and the CTL word $CW_{11}$ is used to record a CTL code associated with the AMS (auto music sensor) and a reverse flag, wherein these CTL codes play essential roles in the present embodiment of the invention.

The format of the CTL word $CW_{11}$ is shown in FIG. 8.

As shown in FIG. 8, the CTL word $CW_{11}$, consists of 12 bits, $D_0$, ..., $D_{11}$, wherein 5 bits, $D_0$, ..., $D_4$, are used to record a program number, $D_5$ a skip flag, $D_6$ a program start flag, $D_7$ an in-program flag, $D_8$ a before-reverse flag, $D_9$ an after-reverse flag, $D_{10}$ a reverse cancel flag, and $D_{11}$ a device type flag.

The program number has a value which can increase periodically within the range from 00000 to 11111. During a recording operation, a program number is assigned to each program by the control data generator 12 in such a manner that the program number is increased by one every program. The assigned program number is recorded in the CTL word $CW_{11}$ in the CTL block of each track TK. For example, if the controller 11 detects a silent period of about 4 sec in record data, the controller 11 regards the silent period as a boundary between a program and another one, and increments the program number assigned to the following record data.

Figure 9:
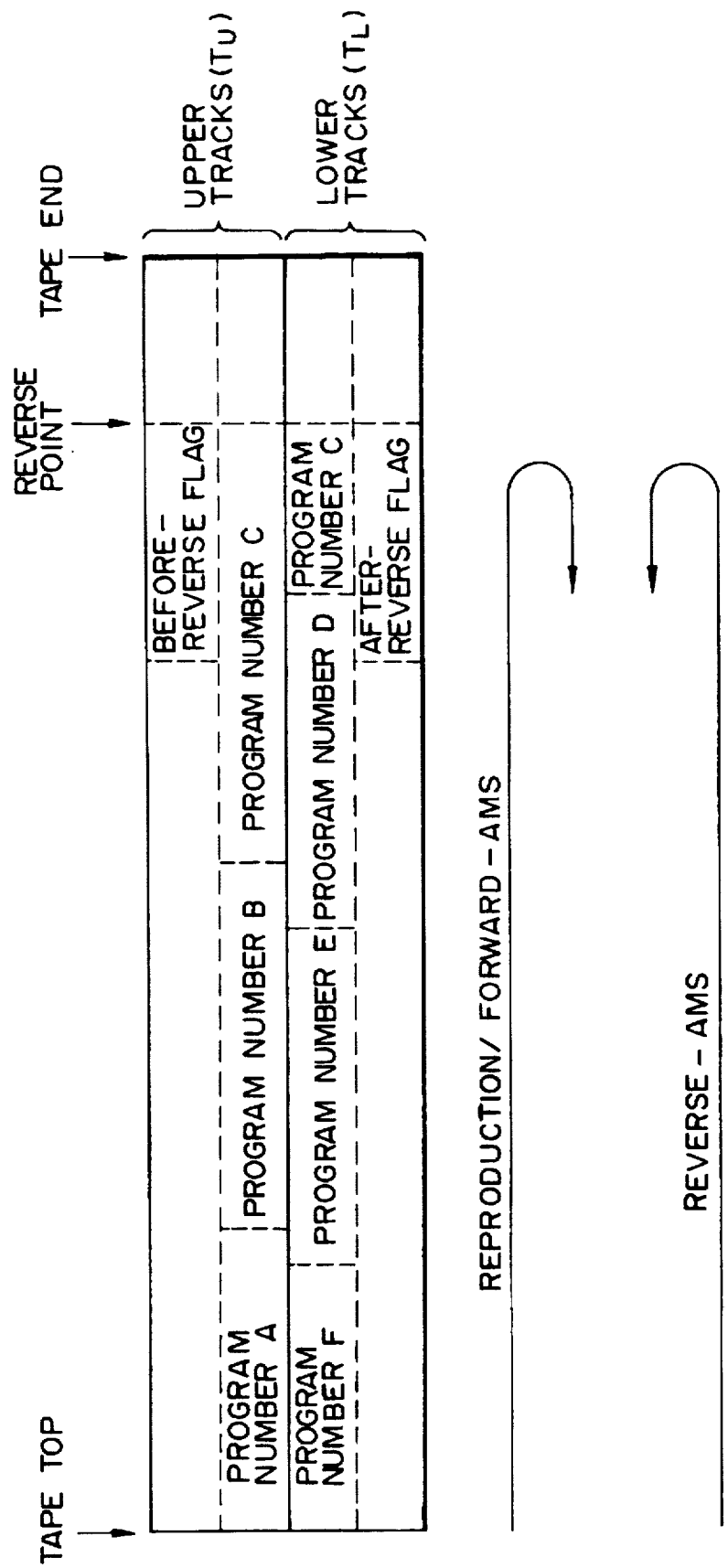
FIG. 9 is a schematic diagram illustrating a searching operation.

If six programs, for example, are recorded on the track groups $T_U$ and $T_L$ on a magnetic tape, the program numbers A to F are assigned to tracks TK in a manner for example such as that shown in FIG. 9. The particular values given to the program numbers A to F are greater by one than the value of the previous program.

A skip flag is set at a location which should be skipped in a reproducing operation. For example, if there are successive silent tracks, "1" is set to the skip flags of a predetermined number of tracks at the start of the silent portion. In a reproducing operation, if the recording/reproducing apparatus detects a point at which the skip flag is set to "1", the tracks following that point are skipped until the AMS (auto music sensor) operation detects the starting point of the next program.

The program start flag is set to "1" for a time period of about 10 sec at the starting point of a program. At a point where the program start flag is set to "1", the program number described above is incremented.

The in-program flag is used to indicate whether tracks are in a program or not.

The before-reverse flag is used to indicate that tracks are in a reverse area before the reverse point. The after-reverse flag is used to indicate that tracks are in a reverse area after the reverse point.

In a system in which a tape is used in both directions, as in the present embodiment, it is known in the art to switch the direction of tape motion from the forward direction to the reverse direction at a time before the tape motion reaches the tape end without having a break in audio data at the tape-motion transition. It is possible to detect the reverse point from the above-described before-reverse and after-reverse flags. The before-reverse or after-reverse flags of the tracks TK in the reverse area are set to "1" as shown in FIG. 9. The switching of the tape travel direction is controlled on the basis of these before-reverse and after-reverse flags.

If it is desired, for some reason, to cancel the before-reverse and after-reverse flags, the reverse cancel flag is set.

The reverse down counter recorded in the CTL word $CW_{10}$ is used to count down the remaining time to the reverse point. For this purpose, values are recorded in a countdown fashion in the reverse down counters of the tracks TK near the reverse area.

By monitoring the value recorded in the reverse down counter near the reverse area, it is possible to know the remaining time to the reverse point.

In this embodiment, in addition to the before-reverse and after-reverse flags, the tape motion is also controlled on the basis of the program numbers detected during a program search operation, and the tape traveling speed is reduced according to the value of the reverse down counter, so that a desired program can be quickly and correctly searched for.

Since the tape is moved at a high speed during a search operation, the tracing path of a magnetic head has a large angle to the tracks as represented by the broken line in FIG. 4. As a result, some data is not read from the tracks during a program search operation. This means that the CTL words of many tracks are missed. If the CTL words at the reverse point are missed, the tape motion switching is not performed correctly. The present embodiment offers a technique for preventing the reverse point from being missed. Furthermore, it is possible, as required, to switch the tape traveling motion at a point before the reverse point so as to prevent the tape from running unnecessarily.

For the above purpose, the program numbers are monitored, during a program search operation, not only for a current track group $T_U$ or $T_L$ but also for the other track group.

For example, when the starting point of a program is being searched for with the upper head unit 9 for the tracks TK in the track group $T_U$, the lower head unit 10 reads the reproduction data from the tracks TK in the track group $T_L$, and the controller 11 monitors the program numbers recorded in the CTL words in the tracks in both track groups.

In a basic operation during a reproducing operation or a forward searching operation, a tape is scanned, as shown in FIG. 9, along the upper part of the tape (track group $T_U$) from the top end toward the tail end. The tape travel direction is reversed at the reverse point, and then the tape is scanned along the lower part of the tape (track group $T_L$) toward the top end.

In a reverse searching operation, the above-described process is performed in reverse.

If the data is reproduced from the upper and lower parts of a tape at the same time, and the program numbers are monitored at the same time for both the upper and lower parts of the tape, then there are three possibilities (1), (2), and (3) as described below in terms of the combination of program numbers which are detected at a time from the upper and lower parts of the tape.

(1) Both program numbers have the same value.

(2) The program numbers are different by one from each other.

(3) The program numbers are different by two or more from each other.

For example, if a tape, on which programs numbered A to F are recorded as shown in FIG. 9, is scanned in the direction from its top end toward the tail end for a searching operation, combinations of program numbers which will be detected before the scanning reaches the tail end of the tape are as follows: A–F; A–E; B–E; B–D; C–D; and C–C. Of these possible combinations, A–F, A–E, B–E, and B–D are of the combination type (3) described above, C–D is of the combination type (2), and C–C is of the combination type (1).

If program numbers of the combination type (1) or (2) are detected, the scanning is now in an area near the reverse point.

Furthermore, if the program numbers are of the combination type (1), the tape travel direction may be reversed before the tape traveling reaches the reverse point.

Figure 10A:
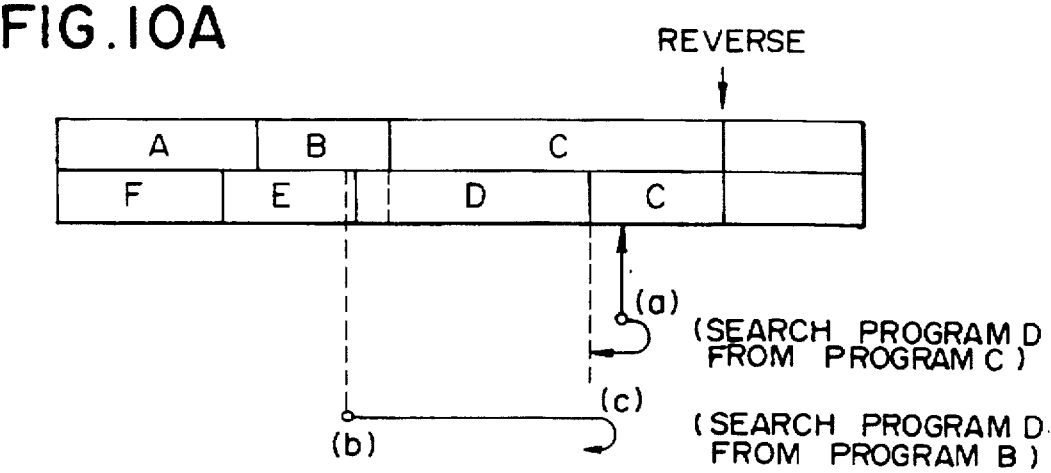
FIG. 10A is a schematic diagram illustrating a manner in which musical programs are recorded on a magnetic tape.

On the other hand, when a tape, on which programs numbered A to F are recorded as shown in FIG. 10, is subjected to a reproducing operation, if, in the middle of a normal reproducing operation of a program C, a quick searching operation is started to search for a program D, and if the above-described condition (1) in terms of the combination of program numbers is met at the start of the searching operation as represented by (a) in FIG. 10A, then it can be concluded, from the above condition (1), that the target program D is located on the lower part of the tape, at a position between the current position and the top end of the tape. Therefore, if the tape travel direction is reversed at that point, it becomes possible to more quickly access the starting point of the target program D.

Furthermore, in the case where the program D is searched for starting at the program B in FIG. 10A, if, after the searching was started from the point (b) in FIG. 10A, the tape travel direction is reversed when it is detected that the condition (1) becomes satisfied at the point (C) in FIG. 10A, it becomes possible to quickly access the starting point of the target program D.

In this case, as a matter of course, it is possible to prevent the tape from traveling to the tail end of the tape beyond the correct reverse point.

In the case where the condition (2) in terms of the combination of program numbers is satisfied, the tape travel direction is switched in different manners depending whether the next program is the target program or the target program is two or more programs away from the current position.

Figure 10B:
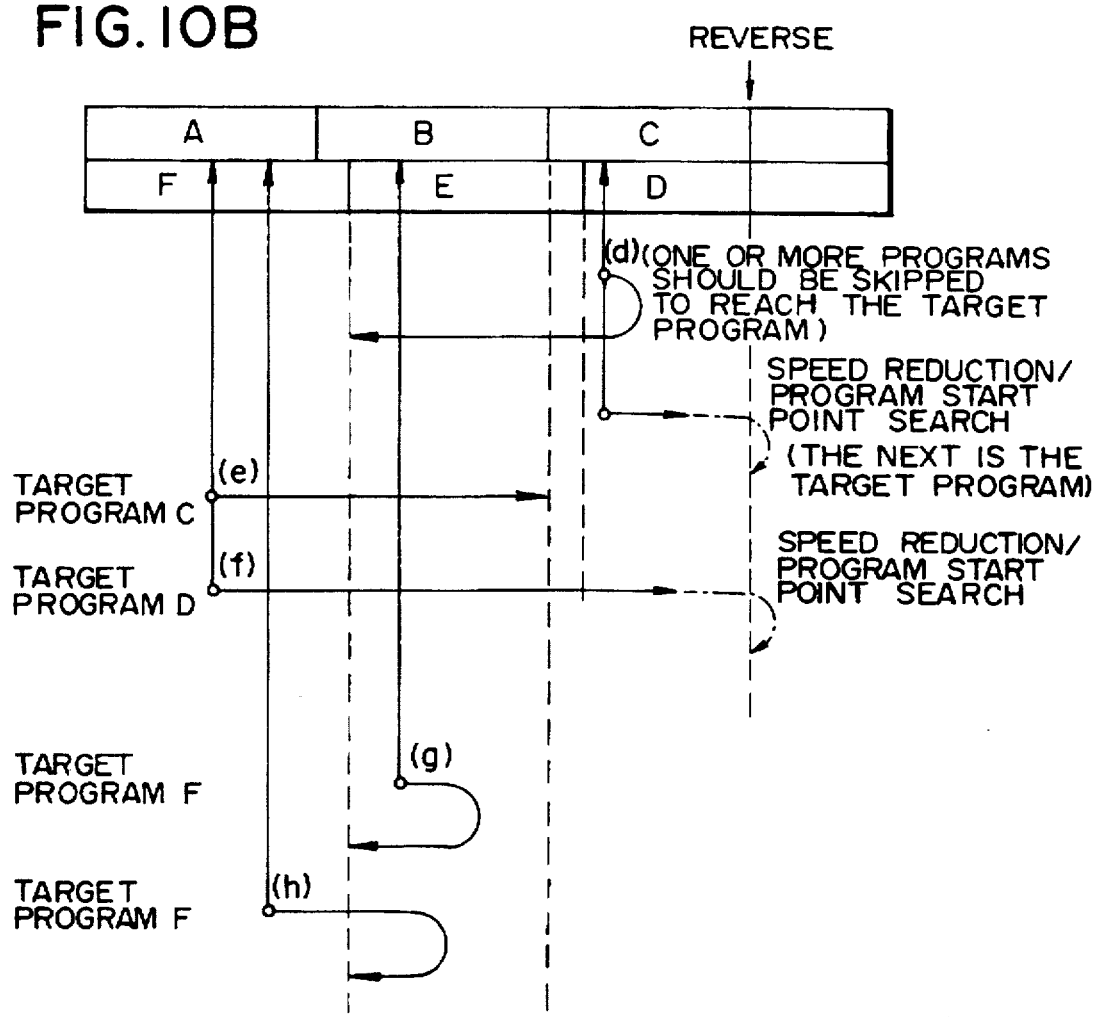
FIG. 10B is a schematic diagram illustrating a manner in which musical programs are recorded on a magnetic tape.

In the latter case, the tape travel direction is reversed immediately at that point. For example, in the case where programs A to F are recorded on a tape as shown in FIG. 10B, if a searching operation for a program F or E is started in the middle of a reproducing operation of a program C as represented by (d) in FIG. 10B, the tape travel direction switching is controlled as follows. At the start of the searching operation, the program D is present on the lower part of the tape, and thus the condition (2) is met. The target program F or E is two or more programs away from the current program C. Thus, it is concluded that the target program is located on the lower part of the tape, between the top end of the tape and the program D.

Therefore, the tape travel direction is switched immediately, thereby quickly searching for the program F or E.

On the other hand, if the condition (2) is met and the next program is the target program, it is concluded that the target program is located at the adjacent position on the opposite part (lower part) of the tape. In this case, searching for the starting point of that program on the opposite part of the tape is started. The condition (2) in terms of the combination of program numbers is met when the searching point is near the reverse position. When it is detected that the target program is located at the adjacent position on the opposite part of the tape, if the tape is moved at the same speed as the normal searching operation, the CTL code containing the reverse mark or the starting point of the program can be missed and an error can occur in the operation. In the present embodiment, the above problem is avoided as follows. That is, the value of the reverse down counter is monitored, and if the reverse down counter indicates that the searching point has reached an area near the reverse point, the tape traveling speed is reduced from the quick searching speed to a normal reproducing speed. This ensures that the starting point of the program and the reverse position can be found without being missed. In the case where the program D is accessed starting from the program C, a searching operation is started at the position (d) shown in FIG. 10B, and the tape speed is reduced during a period represented by the alternately dashed and dotted line so as to ensure that the starting point of the program D can be found correctly. In this embodiment, when the searching point has reached a 2-sec-to-reverse point, the reduction of the tape speed is started.

In an area near the reverse point, there are five possibilities in terms of the locations of programs as shown in FIGS. 11A to 11E.

Figure 11C:
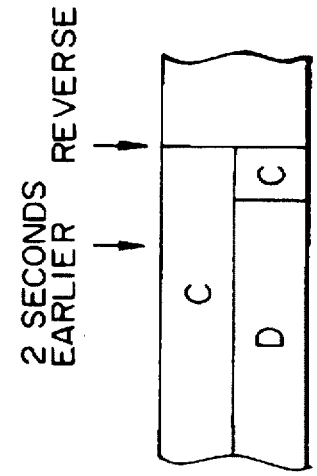
FIG. 11C is a schematic diagram illustrating still another example of a manner in which musical programs are recorded in an area near an end of a magnetic tape.
Figure 11B:
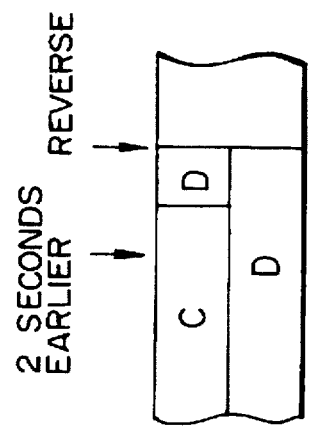
FIG. 11B is a schematic diagram illustrating another example of a manner in which musical programs are recorded in an area near an end of a magnetic tape.
Figure 11E:
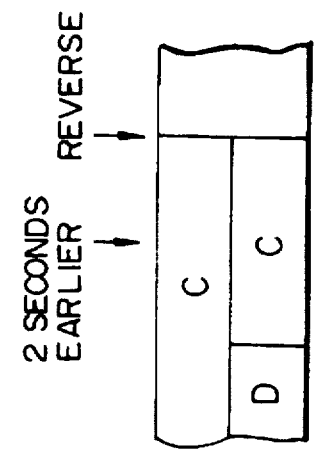
FIG. 11E is a schematic diagram illustrating another example of a manner in which musical programs are recorded in an area near an end of a magnetic tape.
Figure 11A:
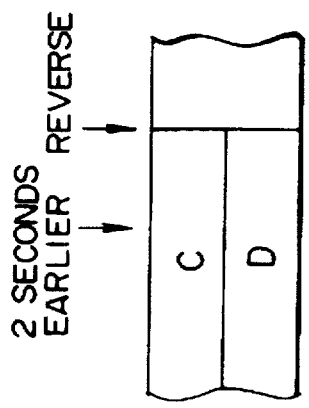
FIG. 11A is a schematic diagram illustrating an example of a manner in which musical programs are recorded in an area near an end of a magnetic tape.

In the case of FIG. 11A, the reverse point is located at a boundary between two programs. In the case of FIGS. 11B, a boundary between two programs is located at a point between the 2-sec-to-reverse point and the reverse point. In the case of FIGS. 11C, a boundary between two programs is located at a point between the 2-sec-after-reverse point and the reverse point.

Figure 11D:
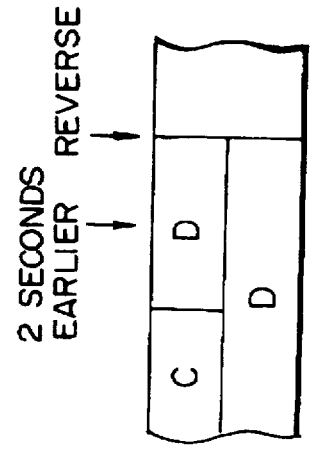
FIG. 11D is a schematic diagram illustrating another example of a manner in which musical programs are recorded in an area near an end of a magnetic tape.

In cases of FIGS. 11D and 11E, a boundary between two programs is located at a point rather apart from the reverse point.

When it is intended to search for the program D starting at the middle of the program C, the program D will be found during a quick searching operation as shown in FIG. 11D. Thus, the tape traveling during the quick searching operation never goes beyond the reverse point. In the case of FIG. 11E, if the tape travel direction is reversed when the condition (1) has become satisfied, that is, when the combination of the program numbers has become C—C in this example, then the starting point of the program D on the lower part of the tape can be found. Therefore, during the searching operation, the searching point never goes beyond the reverse point.

However, in the cases of FIGS. 11A to 11C, there is the possibility that the reverse point will be missed during a quick searching operation. To eliminate such a possibility, the tape traveling speed is reduced when the searching point has reached the 2-sec-to-reverse point. This ensures that the CTL words can be read correctly from each track and thus the reverse point and the program start flag can be found correctly without errors.

In the case where the condition (3) in terms of the combination of program numbers becomes satisfied during a searching operation, if the searching operation is continued further in the same manner, then the target program will be found or otherwise the condition changes from (3) to (2) or (1). In the latter case, the target program will be found in the above-described manner. When it is desired to search for the program C starting at the middle of the program A, if a searching operation is started at the point (e) shown in FIG. 10B, the target program C will be simply found.

On the other hand, when it is desired to search for the program D starting at the middle of the program A, a searching operation is started at the point (f) in FIG. 10B. In this case, the condition (2) is met when the searching point reaches the program C. This means that the target program is located at a position near the reverse point on the opposite part of the tape. Therefore, if the condition remains further in (2) without having a transition to (1), the tape traveling speed is reduced when the remaining time to reach the reverse point becomes 2 sec, and then the starting point of the program D is searched for.

Figure 12:
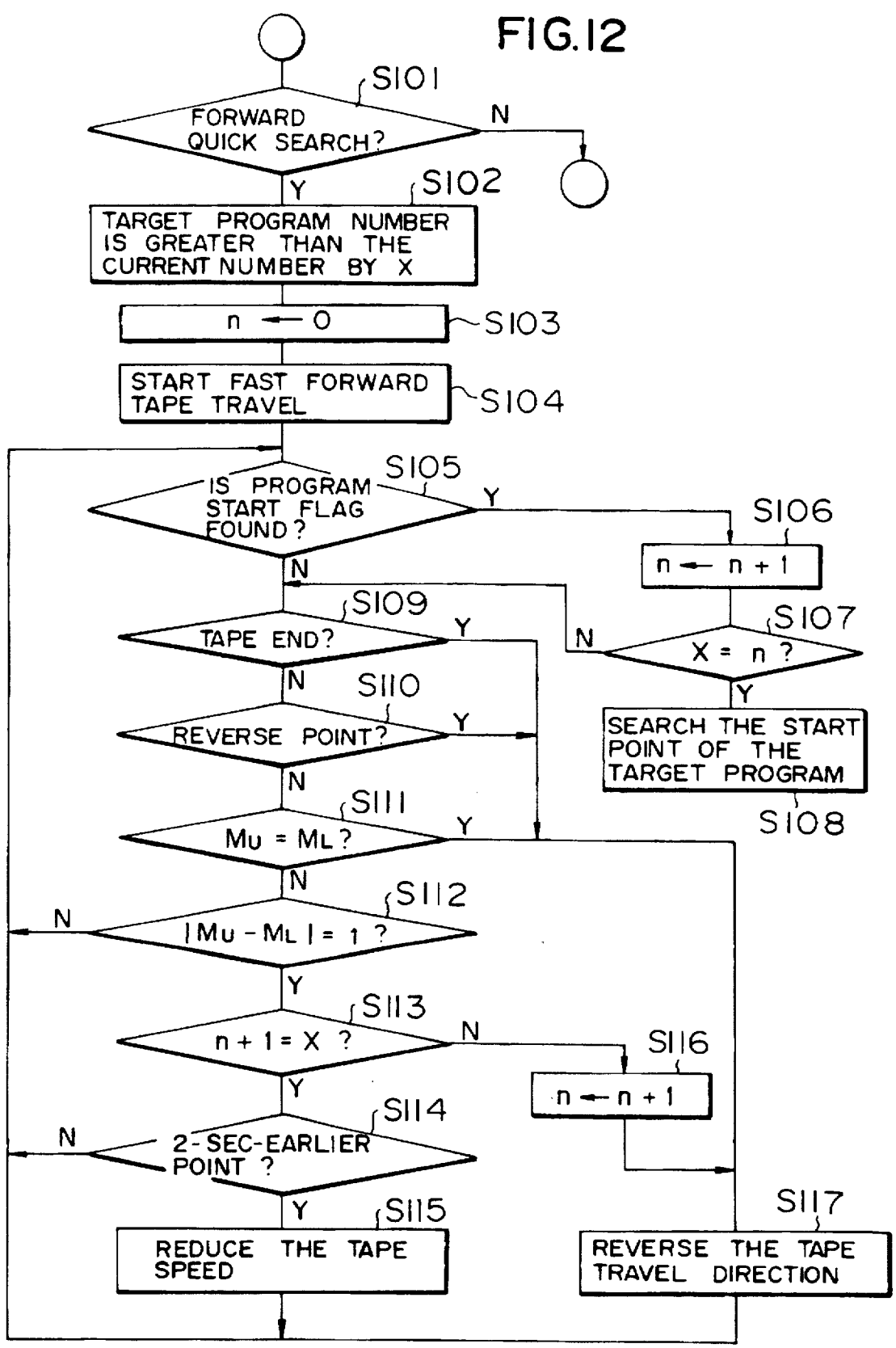
FIG. 12 is a flow chart of a forward researching operation according to the invention.
Figure 13:
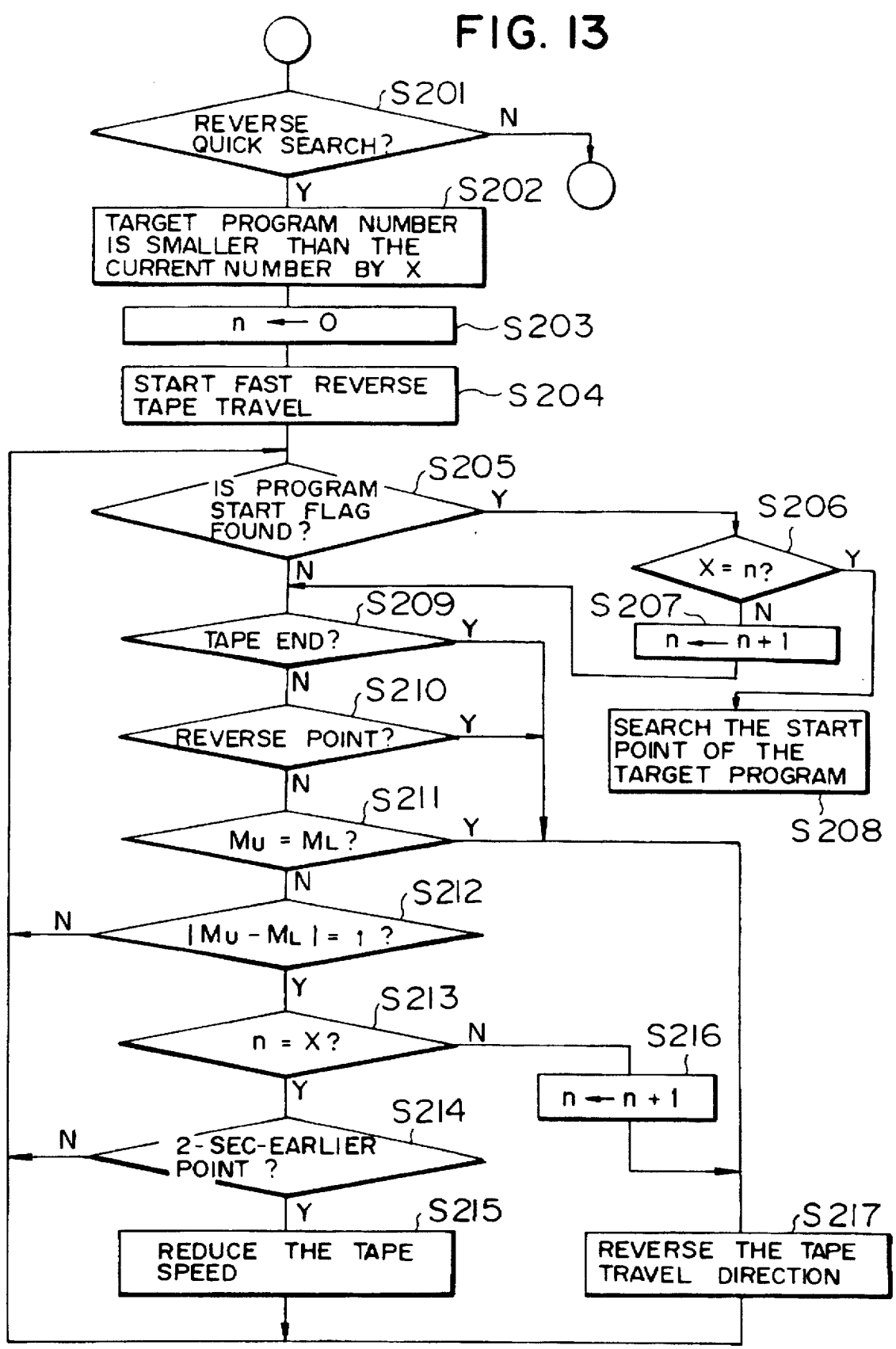
FIG. 13 is a flow chart of a reverse researching operation according to the invention.

FIGS. 12 and 13 illustrate the flow of the processes performed by the controller 11 to achieve a quick searching operation without missing a reverse point wherein FIG. 12 searching operation and FIG. 13 illustrate the process relating to the quick reverse searching operation.

At the first step of the quick forward searching operation, as shown in FIG. 12, the controller 11 sets a variable X used to indicate the target program so that the target program number becomes equal to a value greater by X than the current program number (steps S101 and S102). Then the controller 11 resets the variable n for counting the change in the program number to 0 (step 103). Then at step S104, fast forward (FF) tape traveling is started. If the current reproducing operation is in the upper part mode, the FF tape traveling is performed toward the tail end of a tape. On the other hand, if the current reproducing operation is in the lower part mode, the FF tape traveling is performed toward the top end of the tape.

During the FF tape traveling operation, CTL data is read and the program start flag is monitored. If the controller 11 detects that the program start flag 1, that is, if the starting point of a certain program is found, then the controller 11 increments the variable n (steps S105 and S106). The controller 11 then compares X with n. If X=n, the controller 11 concludes that the target program has been found, and searches for the starting point of that program (steps S107 and S108). Thus, the searching operation is completed. If X=1 and if the next program is the targeted one, when the controller 11 achieves first detection of the program start flag equal to 1 after starting a searching operation, the operation of searching for the starting point of the target program is started. If it is concluded in step S107 that n is not equal to X, the fast forward tape travel is continued further.

During the tape traveling operation, the controller 11 monitors: whether or not a tape end (top end or tail end of the tape) has been reached (step S109); whether a reverse point has been reached (step S110); whether the program number $M_U$ on the upper part of the tape has become equal to the program number $M_L$ on the lower part of the tape (step S111); and whether the difference between the program number $M_U$ on the upper part of the tape and the program number $M_L$ on the lower part of the tape has become equal to 1 (step S112).

As described above, when it is required that the tape travel direction should be reversed at the reverse point, the tape travel direction has to be reversed correctly without traveling to an end of the tape beyond the reverse point. In the case where no reverse point is set or in the case where the tape travels toward the top end of the tape, it is probable that an end of the tape is reached. If an end of the tape has been reached, the process goes to step S117 at which point the tape travel direction is reversed. The process then returns to step S105.

In the case where a reverse point is detected, the process also goes to step S117 at which the tape travel direction is reversed, and then the process returns to step S105.

In a practical operation, before a reverse point is detected, the program number $M_U$ on the upper part of the tape becomes equal to the program number $M_L$ on the lower part of the tape, or the difference between the program number $M_U$ on the upper part of the tape and the program number $M_L$ on the lower part of the tape becomes equal to 1.

If it is detected that $M_U=M_L$, that is, the condition (1) described above has been met, the tape travel direction is reversed. In this case the process jumps from step S111 to step S117 at which the tape travel direction is reversed and then the process returns to step S105.

If it is detected in step S112 that the difference between the program number $M_U$ on the upper part of the tape and the program number $M_L$ on the lower part of the tape has become equal to 1 (this means that the condition (2) is met), then it is checked whether the program next to the current program (with the program number $M_U$) is the targeted program by examining whether X=n+1 (step S113). If X=n+1, the program having a program number $M_L$ located on the lower part of the tape is the targeted one. If it is detected that n+1≠X, the tape travel direction is reversed at that point.

In this case, the variable n is incremented at step S116, and then the process goes to step S117 at which the tape travel direction is reversed. Then the process returns to step S105. In the above step S116, it is required that the variable n should be incremented, because the tape travel direction is reversed before reaching the starting point of the next program ($M_L$ on the lower part of the tape) and the searching operation is re-started at the middle of the program $M_L$ on the lower part of the tape in the opposite direction with the variable n remaining in the same value which would be incremented in step S106 if the starting point of the program $M_U$ were reached.

In step S113, if it is detected that n+1=X, the target program is located at the adjacent position on the opposite part of the tape. Thus, the controller 11 starts an operation of searching for the starting point of the target program. In the above operation, if the target program D is searching under a condition such as that shown in FIG. 11D, the program start flag will be found in step S105 before the searching point reaches a 2-sec-earlier point. Thus, in this case, the process goes to step S108 so as to perform an operation of searching for the starting point of the target program. On the other hand, in the case of FIG. 11E, when it is detected in step S111 that $M_U=M_L$ (=C), the process goes to step S117 at which the tape travel direction is reversed. Then, in step S105, the program start flag is found, and thus the starting point of the target program is searched for in step S108.

In case of any of the FIGS. 11A to 11C, the program start flag of the program D has not been found yet when the searching point has reached the 2-sec-to-reverse point. If the tape is moved further at the high speed mode, a possibility will occur that the reverse point is missed. To avoid such a possibility, the controller 11 monitors the reverse down counter, and if it is detected in step S114 that the searching point has reached the 2-sec-to-reverse point, the process goes to step S115 so as to reduce the tape travel speed down to, for example, a speed equal to a normal reproducing tape speed so that all data can be read from the tracks without missing any data.

This ensures that, in case of any of the FIGS. 11A to 11C, the program start flag of the program D can be found correctly in step S105, and the reverse point can be found correctly in step S110, and thus an operation of searching for the starting point of the target program can be performed correctly in step S108 when the program start flag of the program D is found. When quick reverse searching is performed, the controller 11 sets the variable X so that the target program number is equal to a value smaller by X than the current program number (steps S201 and S202) as shown in FIG. 13. The target position can be the starting point of the current program. In this case, the variable X is set such that X=0 (this means that the target program number is smaller by 0 than the current program number).

Then the controller 11 resets the variable n for counting the change in the program number to 0 (step S203). Then at step S204, fast reverse tape traveling is started. If the current reproducing operation is in the upper part mode, the fast reverse tape traveling is performed toward the top end of a tape. On the other hand, if the current reproducing operation is in the lower part mode, the fast reverse tape traveling is performed toward the tail end of the tape.

During the fast reverse tape traveling operation, CTL data is read and the program start flag is monitored. If the controller 11 detects that the program start flag=1, that is, if the starting point of a certain program is found, then the controller compares X with n. If X=n, the controller 11 concludes that the target program has been found, and searches for the starting point of that program (steps S206 to S208). Thus, the searching operation is completed. For example, if it is intended to search for the starting point of the current program, and X=0, when the controller 11 detects a first program start flag equal to 1 after starting a searching operation, the condition X=n is met at that time and thus an operation of searching for the starting point of the target program is performed.

If it is concluded in step S206 that X≠n, then the variable n is incremented (step S107), and the fast reverse tape traveling operation is continued further.

During the tape traveling operation, as in the fast forward tape traveling operation, the controller 11 monitors: whether or not a tape end (top end or tail end of the tape) has been reached (step S209); whether a reverse point has been reached (step S210); whether the program number $M_U$ on the upper part of the tape has become equal to the program number $M_L$ on the lower part of the tape (step S211); and whether the difference between the program number $M_U$ on the upper part of the tape and the program number $M_L$ on the lower part of the tape has become equal to 1 (step S212).

In the case where no reverse point is set or in the case where the tape travels toward the top end of the tape, if an end of the tape has been reached, the process goes to step S217 at which point the tape travel direction is reversed. Then the process returns to step S205.

In the case where a reverse point is detected, the process also goes to step S217 at which point the tape travel direction is reversed, and then the process returns to step S205.

If it is detected that $M_U=M_L$, that is, the condition (1) described above has been met, the tape travel direction is reversed. Then the process jumps from step S211 to step S217, at which point the tape travel direction is reversed, and then the process returns to step S205. In this case, the reproduction mode changes from the lower reproduction mode to the upper reproduction mode.

If it is detected in step S212 that the difference between the program number $M_U$ on the upper part of the tape and the program number $M_L$ on the lower part of the tape has become equal to 1 (this means that the condition (2) is met), it is checked whether the counting variable n associated with the current program (having a program number $M_L$) is equal to X (step S213). If the counting variable n is equal to X, then it can be concluded that the starting point of the current program is the targeted position and it can also be concluded that the current point is near the reverse point. On the other hand, if n≠X, then it can be concluded that the target point is the starting point of the program with a program number of $M_U$ on the upper part of the tape corresponding to the current program on the lower part of the tape, or otherwise the target point is the starting point of the program immediately next to that. Thus, the tape travel direction is reversed.

In this case, the variable n is incremented at step S216, and then the process goes to step S217, at which point the tape travel direction is reversed. Then, the process returns to step S205. In the above step S216, it is required that the variable n should be incremented, because the tape travel direction is reversed before reaching the starting point of the current program ($M_L$) and the searching operation is re-started at the middle of the program immediately next to the program $M_L$ toward the top end of the tape with the variable n remaining in the same value which would be incremented in step S207 if the starting point of the program immediately next to the program $M_L$ were reached. For example, in the case where the current point is on the program D on the lower part of the tape as shown in FIG. 11D or 11E, and it is intended to search for the program C or the program B located next to the program C, the tape travel direction is reversed when the upper-part program corresponding to the program D on the lower part of the tape has become the program C. In this case, since the starting point of the program D is not scanned, the variable n is incremented for correction.

In the case where it is detected in step S213 that n=X what will occur when it is intended to search for the starting point of the program D under the condition such as that shown in any of FIGS. 11A to 11E, the starting point of the current program on the lower part of the tape is searched for. In the case of FIG. 11E, the program start flag of the program D can be found in step S205, before the searching point reaches the 2-sec-to-reverse point. In this case, the condition X=n is met, and thus an operation of searching for the starting point of the target program is performed in step S208. On the other hand, in the case of FIG. 11D, when it is detected in step S211 that $M_U=M_L$ (=D), the process goes to step S217 at which point the tape travel direction is reversed. Then in step S205, the program start flag of the program D is found, and thus the starting point of the target program is searched for in step S208.

In case of any of FIGS. 11A to 11C, the starting point of the program D has not been found yet when the searching point has reached the 2-sec-to-reverse point. If the tape is moved further at the high speed mode, a possibility will occur that the reverse point is missed. To avoid such a possibility, the controller 11 monitors the reverse down counter, and if it is detected in step S214 that the searching point has reached the 2-sec-to-reverse point, the process goes to step S215 so as to reduce the tape travel speed down to, for example, a speed equal to a normal reproducing tape speed so that all data can be read from the tracks without missing any data.

In case of any of FIGS. 11A to 11C, the program start flag of the program D can be detected in step S205 or otherwise the reverse point can be found correctly in step S210. Thus, if the program start flag of the program D is found in step S205, then the condition X=n is met and an operation of searching for the starting point of the target program is correctly performed in step S208.

In this embodiment, since the fast forward and reverse searching operations are controlled in the manner described above, the tape travel direction is reversed correctly during the searching operation without missing the reverse point. Furthermore, when the condition (1) or (2) is met, the tape travel direction is reversed before reaching the reverse point. This prevents the tape from traveling unnecessarily. Furthermore, searching can be performed in a shorter time.

As will be described in detail below, the above-described embodiment can be modified to achieve a higher searching speed.

Since the program number is monitored at the same time for both the upper and lower parts of the tape, if it is detected that the target program is located on the part opposite to the current part of the tape, it is possible to reverse the tape travel direction without further continuing an unnecessary tape travel along the current part of the tape to the reverse point or an end of the tape.

For example, if it is intended to search for the program F starting at the middle of the program B, as in the case of (g) in FIG. 10B, a fast forward tape travel is first performed toward the tail end of the tape. During this fast forward tape travel, the program number E is detected from the lower part of the tape and thus it turns out that the target program F is located on the lower part of the tape between the current position and the top end of the tape. Thus, the tape travel direction is reversed immediately after the detection of the program E. This allows a great reduction in access time.

When it is intended to search for the program F starting at the middle of the program A as in the case of (h) in FIG. 10B, it can be concluded that the target program F is located at the current position on the opposite part of the tape. In this case, a fast forward tape travel is performed toward the tail end of the tape while monitoring the program number on the lower part of the tape. If the tape travel direction is reversed when the program number E is detected, then the starting point of the program F can be found immediately after the tape reversing operation.

Figure 14:
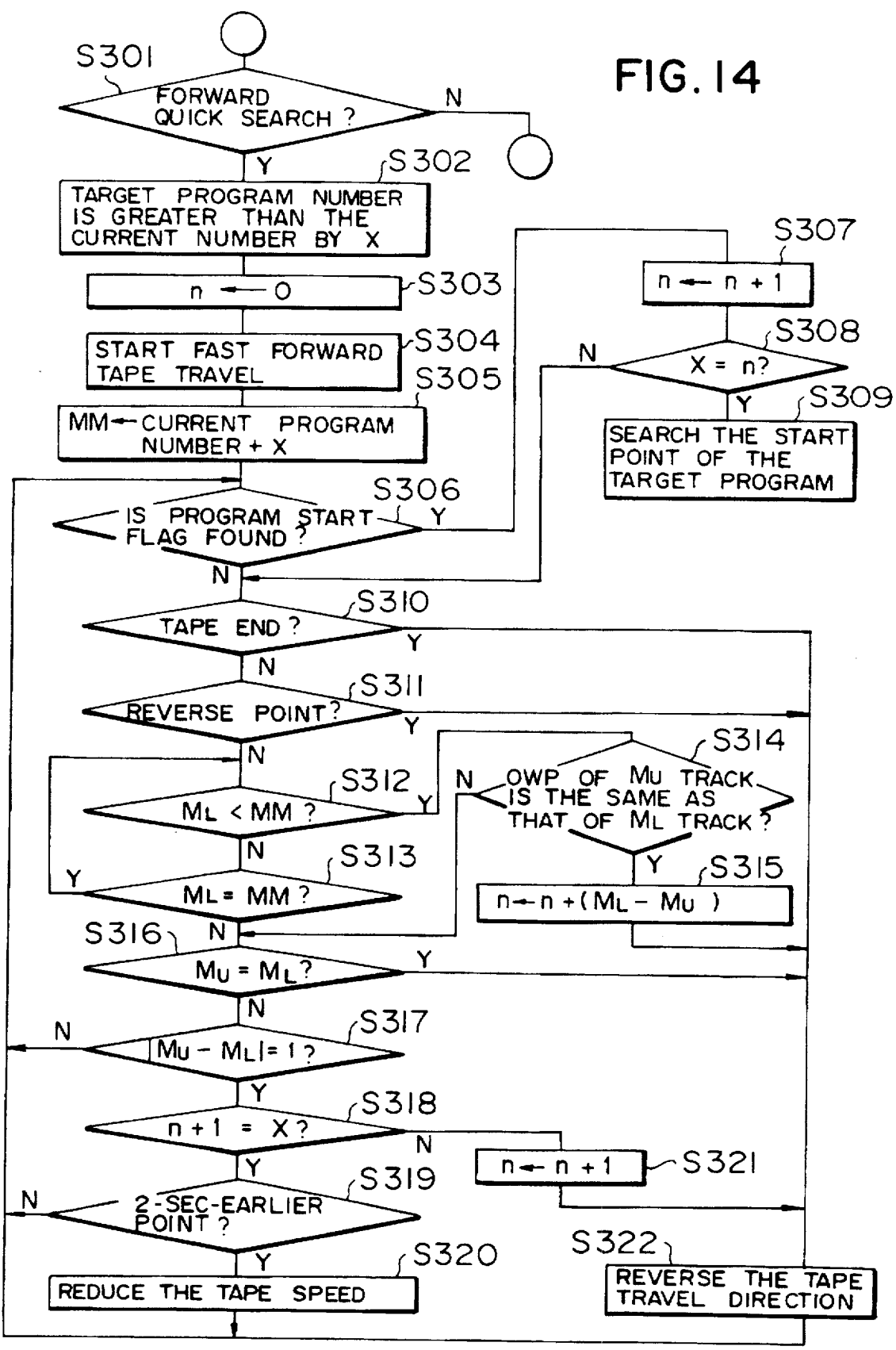
FIG. 14 is a flow chart of a forward researching operation according to a second embodiment of the invention.

The above-described operation and relating process performed by the controller 11 are shown in FIG. 14.

Steps S301 to S304 are the same as steps S101 to 104 shown in FIG. 12. In step S305, at the start of a fast forward searching operation, the target program number MM is set to a value equal to the current program number plus X.

During the searching operation, as in steps S105 to S108 of the previous embodiment shown in FIG. 12, the variable n is incremented each time a program start flag is found, and when the condition X=n becomes valid the controller 11 concludes that the target program has been found. Then the starting point of the target program is searched for. (steps S306, S307, S308, and S309)

Furthermore, as in steps S109, S110, and S117 of the previous embodiment shown in FIG. 12, if an end of the tape or a reverse point is detected, the tape travel direction is reversed (steps S310, S311, and S322).

Steps S316 to S322 are the same as steps S111 to S117 of the previous embodiment shown in FIG. 12. These steps are for the transition of the tape travel direction near the reverse point or for the correct detection of the reverse point.

However, steps S312 to S315 and the process jumping from step S315 to S322 are performed in a manner different from that in FIG. 12.

That is, the program number $M_L$ on the lower part of the tape is monitored during a searching operation and it is checked in step S312 whether the detected program number $M_L$ is smaller than the target program number MM. Furthermore, in step S313, it is checked whether the detected program number $M_L$ is equal to the target program number MM.

If it is detected in step S312 that $M_L$<MM, then it can be concluded that the target program is located between the current position and the top end of the tape. This means that the tape travel direction may be reversed now. On the other hand, if it is detected in step S313 that $M_L$=MM, the tape travel is continued further until $M_L$ becomes smaller than MM. If the tape travel direction is reversed when the condition $M_L$<MM becomes valid, then the starting point of the target program can be found immediately after the transition of the tape travel direction.

Therefore, if it is detected in step S312 that $M_L$ has become smaller than MM, the process goes to step S314 at which the OWP code of the track having a program number equal to $M_U$ is compared with the OWP code of the track having a program number equal to $M_L$. If these OWP codes are not equal to each other, these two programs were recorded in different recording processes, or otherwise, the track having the program number equal to $M_L$ is an unerased track. This means that the program numbers following the current program number $M_U$ are not arranged in correct order and thus there is a possibility that the correct target program has not been reached yet. Therefore, the tape travel direction is not reversed (step S314).

On the other hand, if the OWP codes are equal to each other, it can be concluded that the program next to the current position on the lower part of the tape is the targeted program. In this case, the variable n is substituted so that n=n+($M_L$−$M_U$) (step S315), and then the tape travel direction is reversed in step S322.

The reason for the above-described substitution of the variable n with n+($M_L$−$M_U$) is that the program start flags of the programs, which have a program number in the range from MU+1 to $M_L$ at the time when the tape travel direction is reversed, are not detected and thus the increment of the variable n in step S307 is not performed. Therefore, to make the correction for that, the substitution is performed in step S315.

As described above, after the tape travel direction has been reversed, a program start flag is detected in step S306. After the variable n is incremented, if the condition X=n is met, then it can be concluded that the target program has been found. Therefore, in step S309, the starting point of the target program is searched for.

If the above-described process is applied, it is also possible to achieve a searching operation for the case (g) or (h) shown in FIG. 10B. Thus, a further improvement in the access speed can be achieved.

In a fast reverse searching operation, it is also possible to achieve an improvement in the searching speed by setting the target program number in a similar manner and reversing the tape travel direction when the target program is found on the opposite part of the tape. However, in the fast reverse searching operation, at first, MM is set to a value equal to the current program number minus X. Furthermore, in step S312 in FIG. 14, it is checked whether $M_U \geq MM$. If yes then the OWP code is checked and the variable n is corrected. Then the tape travel direction is reversed at a correct point. The other steps can be performed in the same manner as in FIG. 13.

As described above, the present embodiment provides a technique of improving the searching speed. However, it is assumed here that a different program number is assigned as the CTL data to each program when programs are recorded on a tape.

For example, if ten programs having a total time length of 60 min are recorded successively on a tape having a total length of 60 min, then the program numbers Z to Z+9 will be assigned to the respective programs, and thus no problem occurs. In the above assignment of the program numbers, "Z" refers to a program number employed at the start of the recording operation. For example, when the program number is represented using 5 bits as shown in FIG. 8, if "Z" is "00000", then "Z+9" becomes "01001". In this way, it is possible to assign numbers for example 0 to 9 to ten programs respectively.

However, if the same number "00000" is always assigned to a first program whenever a recording operation is started, the following problems occur. For example, if ten programs are recorded in such a manner that the recording/reproducing apparatus is turned off after each recording operation, then all ten programs will have the same program number equal to "00000". This makes it impossible to perform the searching operation described above.

In this embodiment, to avoid such a problem, a program which is recorded at the start of a recording operation has a program number greater by 1 than that of the program which was recorded at the end of the previous recording operation.

In the present embodiment, for the above purpose, the program number given as one of CTL data is stored in the non-volatile RAM 24 at the end of a recording operation. At the start of the following recording operation, the last program number is read from the non-volatile RAM 24 and a number greater by 1 than that is given as a program number to the first program in that recording operation.

During a recording operation, the controller 11 manages the program number which is given in the CTL data word CW11, the program start flag, and the in-program flag, according to the flow chart shown in FIG. 14.

Figure 15:
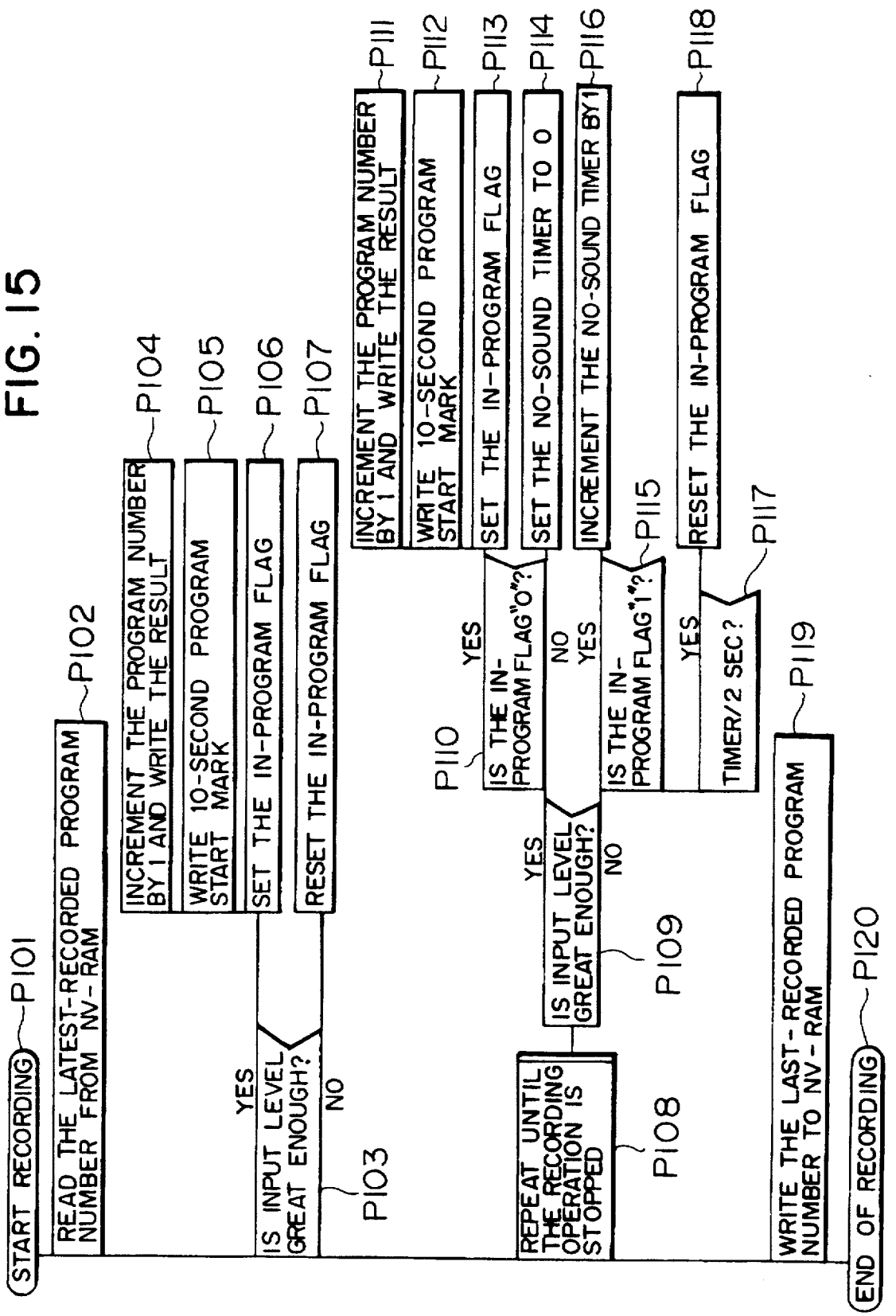
FIG. 15 is a transition diagram relating to a program number selection process during a recording operation.
Figure 16:
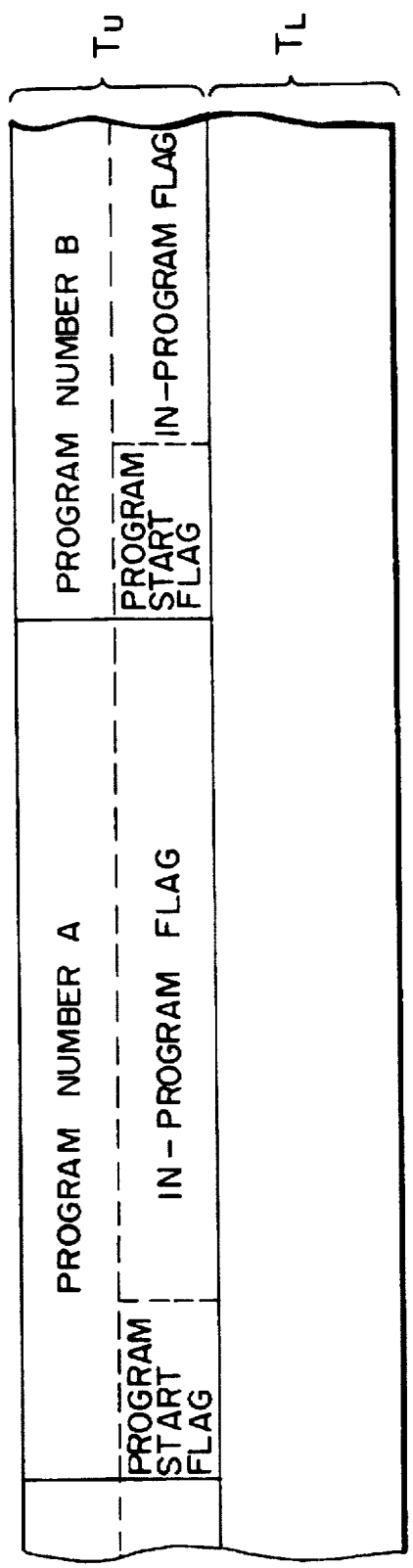
FIG. 16 is a schematic representation of a manner in which program numbers, program start flags, and in-program flags are recorded on a magnetic tape.

As shown in FIG. 15, the same program number (A) is given as CTL data to all tracks belonging to the same program. If another different program is recorded, a program number (B) having an incremented value is given as CTL data to all tracks for that program. On the other hand, the program start flags of the CTL data of tracks are set to "1" for about 10 sec at the start of a program, and the in-program flags in the following tracks are set to "1".

As shown in FIG. 15, at the start of a recording operation (P101), the controller 11 reads a program number used at the end of the previous recording operation from the non-volatile RAM 24 (P102). If this is a first recording operation, "0" is read from the non-volatile RAM 24. The controller 11 monitors the information about the input level given from the data processing circuit 3 (P103). If audio data to be recorded is input, and thus if the input level becomes greater than a threshold (that is, if a signal of a program to be recorded is input), a value greater by 1 than the value read from the non-volatile RAM 24 is given as the program number and transferred to the control data generator 12. Thus the program number is added to the CTL data (P104). For example, if "00010" is read as the program number from the non-volatile RAM 24, then "00011" is given as a program number to a program which is recorded at the first of the current recording operation. Thus, "00011" is given to the bits D0 to D4 of the CTL block shown in FIG. 8 for all tracks until the end of that program is detected.

The program start flag in the CTL data recorded on the tracks for about 10 sec after the start of the recording operation is set to 1 (P105). That is, the bit D6 in the CTL block shown in FIG. 8 of the tracks for the first 10 sec of the program has a value of "1". This program start flag is used to find the starting point of the program during a reproducing operation.

When the writing of the program start flag in the CTL data for 10 sec after the start of the program is complete, the control data generator 12 sets the in-program flag to 1 under the control of the controller 11 (P106). Thus, "1" is written to the bit D7 shown in FIG. 8 on the following tracks until the end of the program is detected.

In step P103, the input level is continuously monitored. If it is detected that the input level becomes lower than the threshold, that is, the input signal becomes silent, for the first time after the start of the first recording operation, it is concluded that the first program has been ended. In this case, the process goes from step P103 to step P107 and the in-program flag is reset. That is, the in-program flag recorded as one of the CTL data on the tracks is turned off during a silent period.

Then the process enters a routine at step P108.

First, at step P109, the input level is monitored. If the signal of the next program is input and thus if the input level becomes greater than the threshold, the in-program flag is examined in step P110. Since the in-program flag has been reset in step P107, the process goes to step P111. In step P111, the program number is incremented, and the resultant value is assigned as a program number to the current program. For example, if the first program which has been recorded before the current program has a program number of "00011", the second or current program has a program number of "00100".

The program start flag in the CTL data recorded on the tracks for about 10 sec after the start of the recording operation is set to 1 (P112).

When the writing of the program start flag in the CTL data for 10 sec after the start of the program is complete, the control data generator 12 sets the in-program flag to 1 under the control of the controller 11 (P113). Thus, "1" is written to the bit D7 shown in FIG. 8 on the following tracks until the end of the program is detected.

After the in-program flag has been set, if the signal of the program is continuously input, then the input level greater than the threshold will be detected in step P109. Furthermore, it is detected in step P110 that the in-program flag is set, and thus the silent period counter is reset to "0" at step P114. The above process is performed repeatedly until the input level becomes less than the threshold and thus a silent input signal is detected.

If a silent input signal is detected, the process goes to step P115 and the in-program flag is checked. If the in-program flag is set, the silent period counter is incremented by 1 (step P118).

If there is a short silent period (for example less than 2 sec) in the middle of the program, when the input level becomes greater than the threshold again, the process goes to step P109, then P110, and finally P114 in which the silent period counter is maintained in the reset state.

In this embodiment, if a two sec or longer silent period is detected, then it is concluded that a new program has been started after the end of the previous program. Therefore, if the input level becomes less than the threshold, the silent period counter is started in step P116 and it is checked, in step P117, whether the silent period has reached 2 sec. If it is detected that the silent period has reached 2 sec, the process goes to step P118 and the in-program flag is reset.

The process returns to step P109 and the routine including steps P109 to P118 is performed repeatedly until the current program is completed.

If a user stops the recording operation by pressing a stop key, or if the recording operation is terminated at the end of a tape, the controller 11 stores the program number which is given at that time by the control data generator 12 into the non-volatile RAM 24. That is, the program number employed for the last program during the current recording operation is memorized.

This program number will be read, in step P102, when the next recording operation is started, and the program which is recorded first in the next recording operation will be given a program number greater by 1 than the last program number.

After storing the program number in the non-volatile RAM 24, a predetermined process is performed and the recording operation is completed (step P120).

In the present invention, since the program number is assigned in the above-described manner, the programs recorded on a tape can have different program numbers even if a great number of programs are recorded on the tape while alternately performing recording and stopping operations. Therefore, in the present invention, the searching operation described earlier can be performed correctly without any problems.

Although the last program number is memorized at the end of a recording operation, in the embodiment described above in connection with FIG. 15, a value greater by 1 than the last program number may also be stored into the non-volatile RAM 24 at the end of a recording operation. In this case, the value is read from the non-volatile RAM 24 at the start of the next recording operation, and this value is employed directly as the program number of a program which is recorded first in that recording operation.

In the above-described embodiment, 5 bits are used to store the program number. In this technique, the program number can have a value in the range of from 0 to 35. However, in some cases, 37 or more programs are recorded on a single tape. In this case, duplication in the program number occurs, and thus it is preferable to check the OPW code described earlier as well as the program number so as to avoid a possibility of error during a searching operation.

If a greater number of bits, for example 10 bits, are used to store the program number, there will be very little chance for program numbers to have duplicated values in practical use.

Although the invention has been described above with reference to specific embodiments of the recording/reproducing apparatus, the description is illustrative of the invention and is not to be construed as limiting the invention. Various changes or modifications may occur in the configuration and processing manner to those skilled in the art without departing from the scope of the invention.

What is claimed is:

1. A reproducing apparatus for searching in a searching direction for a desired program out of a plurality of programs recorded on a recording medium, said recording medium being a magnetic tape having a first part and a second part separated at a substantially central line extending along the length of said recording medium, a forward track group being formed on one of said first part and said second part, a reverse track group being formed on another of said first part and said second part, said reproducing apparatus comprising:

reproducing head means for reproducing a plurality of program numbers from said forward track group and said reverse track group at the same time;

memory means for storing, during an operation of searching for said desired program, a program number corresponding respectively to each of said plurality of programs reproduced from said forward track group and from said reverse track group;

comparison means for comparing one of said plurality of program numbers reproduced from said forward track group and one of said plurality of program numbers reproduced from said reverse track group; and control means for controlling at least one of said searching direction and a searching speed in accordance with a result of said comparison means, wherein reverse information representing a reverse position at which said magnetic tape travel direction is switched between a forward direction and a reverse direction is also recorded in an area near said reverse position of said recording medium, said searching speed during the operation of searching for said desired program is controlled according to said reverse information, and said reverse information recorded on said recording medium is a before-reverse flag recorded on one of said forward track group and reverse track group in an area near said reverse point and an after-reverse flag recorded on another one of said forward track group and reverse track group in an area near said reverse point.

2. The reproducing apparatus according to claim 1, wherein said reverse information recorded on said recording medium is time information.

3. The reproducing apparatus according to claim 1, wherein when said program number associated with one of said forward track group and said reverse track group becomes the same as another said program number associated with said another one of said forward track group and said reverse track group, said searching direction is immediately reversed.

4. The reproducing apparatus according to claim 1, wherein when said program number associated with one of said forward track group and said reverse track group is not the same as said program number associated with said another one of said forward track group and said reverse track group, and when the difference between said program number corresponding to said desired program and said program number corresponding to a current position is equal to or greater than 2, said searching direction is immediately reversed.

5. A recording apparatus for recording a program and a program number corresponding to said program on a recording medium, said recording medium being a magnetic tape having a first part and a second part separated at a substantially central line extending along the length of said recording medium, a forward track group being formed on one of said first part and said second part, a reverse track group being formed on another one of said first part and said second part, said recording apparatus comprising:

memory means for storing said program number corresponding to said program recorded at an end of a recording operation;

generating means for generating a new program number in accordance with said program number which is stored in said memory means; and recording means for recording said new program number, at a start of said recording operation, on said recording medium, wherein reverse information representing a reverse position at which said magnetic tape travel direction is switched between a forward direction and a reverse direction is also recorded in an area near said reverse position of said recording medium, said searching speed during the operation of searching for said desired program is controlled according to said reverse information, and said reverse information recorded on said recording medium is a before-reverse flag recorded on one of said forward track group and reverse track group in an area near said reverse point and an after-reverse flag recorded on another one of said forward track group and reverse track group in an area near said reverse point.

6. The recording apparatus according to claim 5, wherein said new program number is greater by one than said program number previously recorded.

\* \* \* \* \*